(12) United States Patent
Grant et al.

(10) Patent No.: US 8,316,166 B2
(45) Date of Patent: *Nov. 20, 2012

(54) HAPTIC MESSAGING IN HANDHELD COMMUNICATION DEVICES

(75) Inventors: Danny A. Grant, Montreal (CA); Jeffrey Eid, Danville, CA (US); Shoichi Endo, Cupertino, CA (US); Erik J. Shahoian, San Ramon, CA (US); Dean C. Chang, Gaithersburg, MD (US)

(73) Assignee: Immersion Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/538,163

(22) PCT Filed: Dec. 8, 2003

(86) PCT No.: PCT/US03/38900
§ 371 (c)(1), (2), (4) Date: Jun. 2, 2006

(87) PCT Pub. No.: WO2004/053671
PCT Pub. Date: Jun. 24, 2004

(65) Prior Publication Data
US 2006/0288137 A1    Dec. 21, 2006

Related U.S. Application Data

(60) Provisional application No. 60/431,662, filed on Dec. 8, 2002.

(51) Int. Cl.
*G06F 13/12*    (2006.01)
*G08B 5/22*    (2006.01)

(52) U.S. Cl. .......................................... 710/73; 340/7.6

(58) Field of Classification Search .................... 710/73; 340/7.6
See application file for complete search history.

(56) References Cited

U.S. PATENT DOCUMENTS
2,972,140 A    2/1961    Hirsch
(Continued)

FOREIGN PATENT DOCUMENTS
DE    19911416    11/2000
(Continued)

OTHER PUBLICATIONS

Fukuhara et al., Voice Cafe: Conversation Support System in a Group, 2001, IOS Press, pp. 334 and 335.*

(Continued)

*Primary Examiner* — Hyun Nam
(74) *Attorney, Agent, or Firm* — Pillsbury Winthrop Shaw Pittman LLP

(57)    ABSTRACT

Embodiments of the invention relate to methods and systems for providing customized "haptic messaging" to users of handheld communication devices in a variety of applications. In one embodiment, a method of haptic messaging includes: receiving an input signal associated with an actuation of a user-interface member; determining a haptic code associated with the actuation; and including the haptic code in an output signal to be sent to a remote handheld communication device. In another embodiment, a method of haptic messaging includes: receiving an input signal; outputting a request relating to a contact with a user-interface member coupled to a handheld communication device; and
providing a control signal associated with the contact to an actuator coupled to the handheld communication device, the control signal being configured to cause the actuator to output a haptic effect associated with the input signal.

20 Claims, 9 Drawing Sheets

U.S. PATENT DOCUMENTS

| | | |
|---|---|---|
| 3,157,853 A | 11/1964 | Hirsch |
| 3,220,121 A | 11/1965 | Cutler |
| 3,497,668 A | 2/1970 | Hirsch |
| 3,517,446 A | 6/1970 | Corlyon et al. |
| 3,623,064 A | 11/1971 | Kagan |
| 3,875,488 A | 4/1975 | Crocker et al. |
| 3,902,687 A | 9/1975 | Hightower |
| 3,903,614 A | 9/1975 | Diamond et al. |
| 3,911,416 A | 10/1975 | Feder |
| 3,919,691 A | 11/1975 | Noll |
| 3,923,166 A | 12/1975 | Fletcher et al. |
| 4,023,290 A | 5/1977 | Josephson |
| 4,101,884 A | 7/1978 | Benton, Jr. |
| 4,108,146 A | 8/1978 | Golden |
| 4,108,164 A | 8/1978 | Hall, Sr. |
| 4,127,752 A | 11/1978 | Lowthorp |
| 4,160,508 A | 7/1979 | Frosch et al. |
| 4,236,325 A | 12/1980 | Hall et al. |
| 4,242,823 A | 1/1981 | Bruno |
| 4,262,549 A | 4/1981 | Schwellenbach |
| 4,333,070 A | 6/1982 | Barnes |
| 4,334,280 A | 6/1982 | McDonald |
| 4,398,889 A | 8/1983 | Lam et al. |
| 4,414,537 A | 11/1983 | Grimes |
| 4,414,984 A | 11/1983 | Zarudiansky |
| 4,436,188 A | 3/1984 | Jones |
| 4,464,117 A | 8/1984 | Foerst |
| 4,477,043 A | 10/1984 | Repperger |
| 4,484,179 A | 11/1984 | Kasday |
| 4,484,191 A | 11/1984 | Vavra |
| 4,513,235 A | 4/1985 | Acklam et al. |
| 4,542,375 A | 9/1985 | Alles et al. |
| 4,545,023 A | 10/1985 | Mizzi |
| 4,550,221 A | 10/1985 | Mabusth |
| 4,557,275 A | 12/1985 | Dempsey, Jr. |
| 4,560,983 A | 12/1985 | Williams |
| 4,581,491 A | 4/1986 | Boothroyd |
| 4,584,625 A | 4/1986 | Kellogg |
| 4,599,070 A | 7/1986 | Hladky et al. |
| 4,603,284 A | 7/1986 | Perzley |
| 4,604,016 A | 8/1986 | Joyce |
| 4,689,449 A | 8/1987 | Rosen |
| 4,692,756 A | 9/1987 | Clark |
| 4,706,294 A | 11/1987 | Ouchida |
| 4,708,656 A | 11/1987 | De Vries et al. |
| 4,713,007 A | 12/1987 | Alban |
| 4,715,235 A | 12/1987 | Fukui et al. |
| 4,757,453 A | 7/1988 | Nasiff |
| 4,758,165 A | 7/1988 | Tieman et al. |
| 4,763,356 A | 8/1988 | Day, Jr. et al. |
| 4,771,344 A | 9/1988 | Fallacaro et al. |
| 4,772,205 A | 9/1988 | Chlumsky et al. |
| 4,782,327 A | 11/1988 | Kley et al. |
| 4,791,416 A | 12/1988 | Adler |
| 4,794,384 A | 12/1988 | Jackson |
| 4,794,392 A | 12/1988 | Selinko |
| 4,795,296 A | 1/1989 | Jau |
| 4,800,721 A | 1/1989 | Cemenska et al. |
| 4,821,030 A | 4/1989 | Batson et al. |
| 4,823,634 A | 4/1989 | Culver |
| 4,837,734 A | 6/1989 | Ichikawa et al. |
| 4,839,838 A | 6/1989 | LaBiche et al. |
| 4,851,820 A * | 7/1989 | Fernandez .................... 340/7.2 |
| 4,853,874 A | 8/1989 | Iwamoto et al. |
| 4,861,269 A | 8/1989 | Meenen, Jr. |
| 4,868,549 A | 9/1989 | Affinito et al. |
| 4,871,992 A | 10/1989 | Peterson |
| 4,885,565 A | 12/1989 | Embach |
| 4,891,764 A | 1/1990 | McIntosh |
| 4,896,554 A | 1/1990 | Culver |
| 4,906,843 A | 3/1990 | Jones et al. |
| 4,914,624 A | 4/1990 | Dunthorn |
| 4,926,879 A | 5/1990 | Sevrain et al. |
| 4,930,770 A | 6/1990 | Baker |
| 4,934,694 A | 6/1990 | McIntosh |
| 4,935,728 A | 6/1990 | Kley |
| 4,949,119 A | 8/1990 | Moncrief et al. |
| 4,961,038 A | 10/1990 | MacMinn |
| 4,977,298 A | 12/1990 | Fujiyama |
| 4,983,901 A | 1/1991 | Lehmer |
| 5,004,391 A | 4/1991 | Burdea |
| 5,007,300 A | 4/1991 | Siva |
| 5,019,761 A | 5/1991 | Kraft |
| 5,022,384 A | 6/1991 | Freels |
| 5,022,407 A | 6/1991 | Horch et al. |
| 5,035,242 A | 7/1991 | Franklin |
| 5,038,089 A | 8/1991 | Szakaly |
| 5,044,956 A | 9/1991 | Behensky et al. |
| 5,065,145 A | 11/1991 | Purcell |
| 5,076,517 A | 12/1991 | Ferranti et al. |
| 5,078,152 A | 1/1992 | Bond |
| 5,095,303 A | 3/1992 | Clark et al. |
| 5,103,404 A | 4/1992 | McIntosh |
| 5,107,080 A | 4/1992 | Rosen |
| 5,107,262 A | 4/1992 | Cadoz et al. |
| 5,116,180 A | 5/1992 | Fung et al. |
| 5,121,091 A | 6/1992 | Fujiyama |
| 5,133,076 A | 7/1992 | Hawkins et al. |
| 5,139,261 A | 8/1992 | Openiano |
| 5,143,505 A | 9/1992 | Burdea et al. |
| 5,146,566 A | 9/1992 | Hollis, Jr. et al. |
| 5,159,159 A | 10/1992 | Asher |
| 5,165,897 A | 11/1992 | Johnson |
| 5,172,092 A | 12/1992 | Nguyen et al. |
| 5,175,459 A | 12/1992 | Danial et al. |
| 5,184,319 A | 2/1993 | Kramer |
| 5,184,868 A | 2/1993 | Nishiyama |
| 5,185,561 A | 2/1993 | Good et al. |
| 5,186,629 A | 2/1993 | Rohen |
| 5,186,695 A | 2/1993 | Mangseth et al. |
| 5,189,355 A | 2/1993 | Larkins et al. |
| 5,193,963 A | 3/1993 | McAffee et al. |
| 5,197,003 A | 3/1993 | Moncrief et al. |
| 5,203,563 A | 4/1993 | Loper, III |
| 5,212,473 A | 5/1993 | Louis |
| 5,220,260 A | 6/1993 | Schuler |
| 5,223,658 A | 6/1993 | Suzuki |
| 5,223,776 A | 6/1993 | Radke et al. |
| 5,235,868 A | 8/1993 | Culver |
| 5,237,327 A | 8/1993 | Saitoh et al. |
| 5,240,417 A | 8/1993 | Smithson et al. |
| 5,262,777 A | 11/1993 | Low et al. |
| 5,264,768 A | 11/1993 | Gregory et al. |
| 5,270,710 A | 12/1993 | Gaultier et al. |
| 5,271,290 A | 12/1993 | Fischer |
| 5,275,174 A | 1/1994 | Cook |
| 5,275,565 A | 1/1994 | Moncrief |
| 5,283,970 A | 2/1994 | Aigner |
| 5,286,203 A | 2/1994 | Fuller et al. |
| 5,296,871 A | 3/1994 | Paley |
| 5,299,810 A | 4/1994 | Pierce |
| 5,302,132 A | 4/1994 | Corder |
| 5,309,140 A | 5/1994 | Everett |
| 5,313,230 A | 5/1994 | Venolia et al. |
| 5,316,017 A | 5/1994 | Edwards et al. |
| 5,334,027 A | 8/1994 | Wherlock |
| 5,341,459 A | 8/1994 | Backes |
| 5,354,162 A | 10/1994 | Burdea et al. |
| 5,355,148 A | 10/1994 | Anderson |
| 5,376,948 A | 12/1994 | Roberts et al. |
| 5,381,080 A | 1/1995 | Schnell et al. |
| 5,389,849 A | 2/1995 | Asano et al. |
| 5,389,865 A | 2/1995 | Jacobus et al. |
| 5,396,266 A | 3/1995 | Brimhall |
| 5,398,044 A | 3/1995 | Hill |
| 5,399,091 A | 3/1995 | Mitsumoto |
| 5,405,152 A | 4/1995 | Katanics et al. |
| 5,414,337 A | 5/1995 | Schuler |
| 5,432,531 A | 7/1995 | Calder et al. |
| 5,436,622 A | 7/1995 | Gutman et al. |
| 5,437,607 A | 8/1995 | Taylor |
| 5,450,613 A | 9/1995 | Takahara et al. |
| 5,451,924 A | 9/1995 | Massimino et al. |
| 5,457,479 A | 10/1995 | Cheng |
| 5,459,382 A | 10/1995 | Jacobus et al. |
| 5,461,711 A | 10/1995 | Wang et al. |
| 5,466,213 A | 11/1995 | Hogan |

| Patent | Date | Name |
|---|---|---|
| 5,471,571 A | 11/1995 | Smith et al. |
| 5,473,235 A | 12/1995 | Lance et al. |
| 5,473,344 A | 12/1995 | Bacon et al. |
| 5,491,477 A | 2/1996 | Clark et al. |
| 5,506,605 A | 4/1996 | Paley |
| 5,512,919 A | 4/1996 | Araki |
| 5,513,100 A | 4/1996 | Parker et al. |
| 5,521,336 A | 5/1996 | Buchanan et al. |
| 5,530,455 A | 6/1996 | Gillick et al. |
| 5,542,672 A | 8/1996 | Meredith |
| 5,547,382 A | 8/1996 | Yamasaki |
| 5,557,365 A | 9/1996 | Ohsawa |
| 5,562,707 A | 10/1996 | Prochazka et al. |
| 5,563,632 A | 10/1996 | Roberts |
| 5,565,887 A | 10/1996 | McCambridge et al. |
| 5,575,761 A | 11/1996 | Hajianpour |
| 5,576,727 A | 11/1996 | Rosenberg et al. |
| 5,577,981 A | 11/1996 | Jarvik |
| 5,580,251 A | 12/1996 | Gilkes et al. |
| 5,583,407 A | 12/1996 | Yamaguchi |
| 5,587,937 A | 12/1996 | Massie et al. |
| 5,589,828 A | 12/1996 | Armstrong |
| 5,589,854 A | 12/1996 | Tsai |
| 5,591,082 A | 1/1997 | Jensen et al. |
| 5,596,347 A | 1/1997 | Robertson et al. |
| 5,600,777 A | 2/1997 | Wang et al. |
| 5,619,180 A | 4/1997 | Massimino et al. |
| 5,625,576 A | 4/1997 | Massie et al. |
| 5,629,594 A | 5/1997 | Jacobus et al. |
| 5,638,060 A | 6/1997 | Kataoka et al. |
| 5,642,469 A | 6/1997 | Hannaford et al. |
| 5,643,087 A | 7/1997 | Marcus et al. |
| 5,644,516 A | 7/1997 | Podwalny et al. |
| 5,656,901 A | 8/1997 | Kurita |
| 5,666,138 A | 9/1997 | Culver |
| 5,666,473 A | 9/1997 | Wallace |
| 5,670,755 A | 9/1997 | Kwon |
| 5,684,722 A | 11/1997 | Thorner et al. |
| 5,690,582 A | 11/1997 | Ulrich et al. |
| 5,691,747 A | 11/1997 | Amano |
| 5,691,898 A | 11/1997 | Rosenberg et al. |
| 5,694,013 A | 12/1997 | Stewart et al. |
| 5,699,059 A | 12/1997 | Hiller |
| 5,709,219 A | 1/1998 | Chen et al. |
| 5,714,978 A | 2/1998 | Yamanaka |
| 5,719,561 A | 2/1998 | Gonzales |
| 5,721,566 A | 2/1998 | Rosenberg et al. |
| 5,724,106 A | 3/1998 | Autry et al. |
| 5,724,278 A | 3/1998 | Ohgose et al. |
| 5,729,249 A | 3/1998 | Yasutake |
| 5,731,804 A | 3/1998 | Rosenberg |
| 5,732,347 A | 3/1998 | Bartle et al. |
| 5,734,373 A | 3/1998 | Rosenberg et al. |
| 5,736,978 A | 4/1998 | Hasser et al. |
| 5,739,811 A | 4/1998 | Rosenberg et al. |
| 5,742,278 A | 4/1998 | Chen et al. |
| 5,745,715 A | 4/1998 | Pickover et al. |
| 5,748,185 A | 5/1998 | Stephan et al. |
| 5,754,023 A | 5/1998 | Roston et al. |
| 5,755,577 A | 5/1998 | Gillio |
| 5,757,358 A | 5/1998 | Osga |
| 5,760,764 A | 6/1998 | Martinelli |
| 5,766,016 A | 6/1998 | Sinclair |
| 5,767,457 A | 6/1998 | Gerpheide et al. |
| 5,767,839 A | 6/1998 | Rosenberg |
| 5,769,640 A | 6/1998 | Jacobus et al. |
| 5,771,037 A | 6/1998 | Jackson |
| 5,781,172 A | 7/1998 | Engel et al. |
| 5,784,052 A | 7/1998 | Keyson |
| 5,785,630 A | 7/1998 | Bobick et al. |
| 5,790,108 A | 8/1998 | Salcudean |
| 5,791,992 A | 8/1998 | Crump et al. |
| 5,802,353 A | 9/1998 | Avila et al. |
| 5,804,780 A | 9/1998 | Bartha |
| 5,805,140 A | 9/1998 | Rosenberg et al. |
| 5,805,165 A | 9/1998 | Thorne, III et al. |
| 5,805,416 A | 9/1998 | Friend et al. |
| 5,805,601 A | 9/1998 | Takeda et al. |
| 5,808,601 A | 9/1998 | Leah et al. |
| 5,808,603 A | 9/1998 | Chen |
| 5,821,921 A | 10/1998 | Osborn et al. |
| 5,823,876 A | 10/1998 | Unbehand |
| 5,825,308 A | 10/1998 | Rosenberg |
| 5,828,197 A | 10/1998 | Martin |
| 5,828,364 A | 10/1998 | Siddiqui |
| 5,831,408 A | 11/1998 | Jacobus et al. |
| 5,832,386 A | 11/1998 | Nojima et al. |
| 5,835,080 A | 11/1998 | Beeteson et al. |
| 5,844,392 A | 12/1998 | Peurach et al. |
| 5,844,506 A | 12/1998 | Binstead |
| 5,877,748 A | 3/1999 | Redlich |
| 5,880,714 A | 3/1999 | Rosenberg et al. |
| 5,884,029 A | 3/1999 | Brush, II et al. |
| 5,887,995 A | 3/1999 | Holehan |
| 5,889,236 A | 3/1999 | Gillespie et al. |
| 5,889,670 A | 3/1999 | Schuler et al. |
| 5,896,125 A | 4/1999 | Niedzwiecki |
| 5,897,437 A | 4/1999 | Nishiumi et al. |
| 5,903,257 A | 5/1999 | Nishiumi et al. |
| 5,907,615 A | 5/1999 | Kaschke ........................ 379/433 |
| 5,912,661 A | 6/1999 | Siddiqui |
| 5,914,705 A | 6/1999 | Johnson et al. |
| 5,914,708 A | 6/1999 | LaGrange et al. |
| 5,917,906 A | 6/1999 | Thornton ........................ 379/433 |
| 5,929,846 A | 7/1999 | Rosenberg et al. |
| 5,942,733 A | 8/1999 | Allen et al. |
| 5,943,044 A | 8/1999 | Martintelli et al. |
| 5,944,151 A | 8/1999 | Jakobs et al. |
| 5,953,413 A | 9/1999 | Peyer et al. |
| 5,956,016 A | 9/1999 | Kuenzner et al. |
| 5,956,484 A | 9/1999 | Rosenberg et al. |
| 5,959,613 A | 9/1999 | Rosenberg et al. |
| 5,973,689 A | 10/1999 | Gallery |
| 5,977,867 A | 11/1999 | Blouin |
| 5,982,304 A | 11/1999 | Selker et al. |
| 5,982,352 A | 11/1999 | Pryor |
| 5,984,785 A | 11/1999 | Takeda et al. |
| 5,986,643 A | 11/1999 | Harvill et al. |
| 5,988,902 A | 11/1999 | Holehan |
| 5,990,869 A | 11/1999 | Kubica et al. |
| 5,999,168 A | 12/1999 | Rosenberg et al. |
| 6,001,014 A | 12/1999 | Ogata et al. |
| 6,004,134 A | 12/1999 | Marcus et al. |
| 6,005,551 A | 12/1999 | Osborne et al. |
| 6,008,800 A | 12/1999 | Pryor |
| 6,018,711 A | 1/2000 | French-St. George et al. ........................ 704/275 |
| 6,020,876 A | 2/2000 | Rosenberg et al. |
| 6,024,576 A | 2/2000 | Bevirt et al. |
| 6,028,531 A * | 2/2000 | Wanderlich ........................ 340/7.6 |
| 6,028,593 A | 2/2000 | Rosenberg et al. ........... 345/156 |
| 6,037,927 A | 3/2000 | Rosenberg |
| 6,061,004 A | 5/2000 | Rosenberg |
| 6,067,081 A | 5/2000 | Hahlganss et al. |
| 6,071,194 A | 6/2000 | Sanderson et al. ............... 463/37 |
| 6,072,475 A | 6/2000 | Van Ketwich et al. |
| 6,081,536 A | 6/2000 | Gorsuch et al. |
| 6,084,587 A | 7/2000 | Tarr et al. |
| 6,088,017 A | 7/2000 | Tremblay et al. |
| 6,088,019 A | 7/2000 | Rosenberg |
| 6,094,565 A | 7/2000 | Alberth et al. |
| 6,100,874 A | 8/2000 | Schena et al. |
| 6,102,803 A | 8/2000 | Takeda et al. |
| 6,110,130 A | 8/2000 | Kramer |
| 6,111,577 A | 8/2000 | Zilles et al. |
| 6,118,435 A | 9/2000 | Fujita et al. |
| 6,125,264 A | 9/2000 | Watanabe et al. |
| 6,125,385 A | 9/2000 | Wies et al. |
| 6,128,006 A | 10/2000 | Rosenberg |
| 6,131,097 A | 10/2000 | Peurach et al. |
| 6,140,987 A | 10/2000 | Stein et al. |
| 6,147,422 A | 11/2000 | Delson et al. |
| 6,147,674 A | 11/2000 | Rosenberg et al. |
| 6,151,332 A | 11/2000 | Gorsuch et al. |
| 6,154,201 A | 11/2000 | Levin et al. |
| 6,160,489 A | 12/2000 | Perry et al. |
| 6,161,126 A | 12/2000 | Wies et al. ........................ 709/203 |
| 6,166,723 A | 12/2000 | Schena et al. |

| | | | | | | |
|---|---|---|---|---|---|---|
| 6,169,540 B1 | 1/2001 | Rosenberg et al. ............ 345/326 | | 6,963,839 B1 | 11/2005 | Osterman et al. |
| 6,171,191 B1 | 1/2001 | Ogata et al. | | 6,982,696 B1 | 1/2006 | Shahoian |
| 6,178,157 B1 | 1/2001 | Berg et al. | | 7,009,595 B2 | 3/2006 | Roberts et al. |
| 6,184,868 B1 | 2/2001 | Shahoian | | 7,061,466 B1 | 6/2006 | Moore |
| 6,198,206 B1 | 3/2001 | Saarmaa et al. | | 7,096,045 B2 | 8/2006 | Yoshinaga |
| 6,215,778 B1 | 4/2001 | Lomp et al. | | 7,103,389 B2 | 9/2006 | Shibata |
| 6,218,966 B1 | 4/2001 | Goodwin et al. | | 7,113,177 B2 | 9/2006 | Franzen |
| 6,219,032 B1 | 4/2001 | Rosenberg et al. ............ 345/157 | | 7,127,271 B1 | 10/2006 | Fujisaki |
| 6,219,034 B1 | 4/2001 | Elbing et al. | | 7,149,208 B2 | 12/2006 | Mattaway et al. |
| 6,236,647 B1 | 5/2001 | Amalfitano | | 7,151,528 B2 | 12/2006 | Taylor et al. |
| 6,239,790 B1 | 5/2001 | Martintelli et al. | | 7,159,008 B1 * | 1/2007 | Wies et al. ............ 709/206 |
| 6,243,080 B1 | 6/2001 | Molne | | 7,171,191 B2 | 1/2007 | Olson |
| 6,262,717 B1 | 7/2001 | Donohue et al. | | 7,184,765 B1 | 2/2007 | Birnie et al. |
| 6,262,718 B1 | 7/2001 | Findlay et al. | | 7,215,329 B2 | 5/2007 | Yoshikawa et al. |
| 6,292,174 B1 | 9/2001 | Mallett et al. ................ 345/163 | | 7,218,310 B2 | 5/2007 | Tierling |
| 6,300,936 B1 | 10/2001 | Braun et al. | | 7,225,000 B2 | 5/2007 | Katayanagi |
| 6,307,465 B1 | 10/2001 | Kayma et al. | | 7,289,796 B2 | 10/2007 | Kudoh |
| 6,323,846 B1 | 11/2001 | Westerman et al. | | 7,292,227 B2 | 11/2007 | Fukumoto et al. |
| 6,326,901 B1 | 12/2001 | Gonzales | | 7,312,790 B2 | 12/2007 | Sato et al. |
| 6,332,075 B1 | 12/2001 | Verdonk | | 7,328,020 B2 | 2/2008 | Masuda et al. |
| 6,337,678 B1 | 1/2002 | Fish ............ 345/156 | | 7,336,260 B2 | 2/2008 | Martin et al. |
| 6,359,550 B1 | 3/2002 | Brisebois et al. ......... 340/407.1 | | 7,336,977 B2 | 2/2008 | Katayanagi |
| 6,373,463 B1 | 4/2002 | Beeks | | 7,369,115 B2 | 5/2008 | Cruz-Hernandez et al. |
| 6,388,655 B1 | 5/2002 | Leung | | 7,373,120 B2 | 5/2008 | Messel et al. |
| 6,388,999 B1 | 5/2002 | Gorsuch et al. | | 7,424,272 B2 | 9/2008 | Horiguchi |
| 6,411,198 B1 | 6/2002 | Hirai et al. | | 7,450,110 B2 | 11/2008 | Shahoian et al. |
| 6,411,276 B1 | 6/2002 | Braun et al. | | 7,463,249 B2 | 12/2008 | Knowles et al. |
| 6,414,674 B1 | 7/2002 | Kamper et al. | | 7,533,342 B1 | 5/2009 | Vialle et al. |
| 6,415,138 B2 | 7/2002 | Sirola et al. | | 7,548,232 B2 | 6/2009 | Shahoian et al. |
| 6,418,323 B1 | 7/2002 | Bright et al. | | 7,728,820 B2 | 6/2010 | Rosenberg et al. |
| 6,422,941 B1 | 7/2002 | Thorner et al. | | 2001/0036832 A1 | 11/2001 | McKay ............ 455/456 |
| 6,424,356 B2 | 7/2002 | Chang et al. | | 2001/0044328 A1 | 11/2001 | Tsukamoto |
| 6,429,846 B2 | 8/2002 | Rosenberg et al. ............ 345/156 | | 2002/0012323 A1 | 1/2002 | Petite et al. |
| 6,435,794 B1 | 8/2002 | Springer ............ 414/5 | | 2002/0039914 A1 | 4/2002 | Hama et al. |
| 6,438,390 B1 | 8/2002 | Awan | | 2002/0044155 A1 | 4/2002 | Becker ............ 345/684 |
| 6,438,392 B1 | 8/2002 | Toba | | 2002/0035854 A1 | 8/2002 | Rosenberg et al. |
| 6,441,599 B1 | 8/2002 | Kropidlowski ............ 324/67 | | 2002/0107936 A1 * | 8/2002 | Amon ............ 709/217 |
| 6,445,284 B1 | 9/2002 | Cruz-Hernandez et al. | | 2002/0111737 A1 | 8/2002 | Hoisko |
| 6,447,069 B1 | 9/2002 | Terris et al. | | 2002/0130904 A1 | 9/2002 | Becker et al. ............ 345/753 |
| 6,448,977 B1 | 9/2002 | Braun et al. | | 2002/0177471 A1 * | 11/2002 | Kaaresoja et al. ............ 455/567 |
| 6,469,695 B1 | 10/2002 | White | | 2002/0193125 A1 | 12/2002 | Smith et al. |
| 6,473,069 B1 | 10/2002 | Gerpheide | | 2002/0194246 A1 | 12/2002 | Moskowitz et al. ............ 709/102 |
| 6,487,421 B2 | 11/2002 | Hess et al. | | 2003/0002682 A1 | 1/2003 | Smith et al. |
| 6,509,892 B1 | 1/2003 | Kamper et al. | | 2003/0006892 A1 | 1/2003 | Church |
| 6,518,958 B1 | 2/2003 | Miyajima et al. | | 2003/0016211 A1 | 1/2003 | Woolley |
| 6,525,749 B1 | 2/2003 | Moran et al. | | 2003/0022701 A1 | 1/2003 | Gupta |
| 6,529,122 B1 | 3/2003 | Magnussen et al. | | 2003/0038776 A1 * | 2/2003 | Rosenberg et al. ............ 345/156 |
| 6,535,201 B1 | 3/2003 | Cooper et al. | | 2003/0045266 A1 | 3/2003 | Staskal et al. |
| 6,563,487 B2 | 5/2003 | Martin et al. | | 2003/0048260 A1 | 3/2003 | Matusis |
| 6,574,489 B1 | 6/2003 | Uriya | | 2003/0058265 A1 | 3/2003 | Robinson et al. |
| 6,606,508 B2 | 8/2003 | Becker et al. | | 2003/0067440 A1 | 4/2003 | Rank |
| 6,610,936 B2 | 8/2003 | Gillespie et al. | | 2003/0071795 A1 | 4/2003 | Baldauf et al. |
| 6,626,358 B1 | 9/2003 | Breimesser et al. ............ 235/380 | | 2003/0076298 A1 | 4/2003 | Rosenberg |
| 6,628,195 B1 | 9/2003 | Coudon | | 2003/0078071 A1 | 4/2003 | Uchiyama |
| 6,636,197 B1 | 10/2003 | Goldenbert et al. | | 2003/0095105 A1 | 5/2003 | Vaananen |
| 6,636,202 B2 | 10/2003 | Ishmael, Jr. et al. | | 2003/0128191 A1 | 7/2003 | Strasser et al. |
| 6,639,581 B1 | 10/2003 | Moore | | 2003/0128192 A1 | 7/2003 | Van Os |
| 6,639,582 B1 | 10/2003 | Shrader | | 2003/0174121 A1 | 9/2003 | Poupyrev et al. ............ 345/156 |
| 6,647,145 B1 | 11/2003 | Gay | | 2003/0184574 A1 | 10/2003 | Phillips et al. |
| 6,671,618 B2 | 12/2003 | Hoisko | | 2003/0236729 A1 * | 12/2003 | Epstein et al. ............ 705/36 |
| 6,680,729 B1 | 1/2004 | Shahoian et al. | | 2004/0059790 A1 | 3/2004 | Austin-Lane et al. |
| 6,690,955 B1 | 2/2004 | Komiyama | | 2004/0067780 A1 | 4/2004 | Eiden |
| 6,697,043 B1 | 2/2004 | Shahoian | | 2004/0189484 A1 | 9/2004 | Li |
| 6,710,518 B2 | 3/2004 | Morton et al. ............ 310/328 | | 2004/0203656 A1 | 10/2004 | Andrew et al. |
| 6,723,937 B2 | 4/2004 | Englemann et al. | | 2004/0204049 A1 | 10/2004 | Hsu et al. |
| 6,727,916 B1 | 4/2004 | Ballard | | 2004/0219952 A1 | 11/2004 | Bernhart et al. |
| 6,792,294 B1 | 9/2004 | Kushita | | 2005/0048955 A1 | 3/2005 | Ring |
| 6,819,922 B1 | 11/2004 | Janz | | 2005/0134561 A1 | 6/2005 | Tierling et al. |
| 6,822,635 B2 | 11/2004 | Shahoian et al. | | 2006/0248183 A1 | 11/2006 | Barton |
| 6,834,373 B2 | 12/2004 | Dieberger | | 2007/0229478 A1 | 10/2007 | Rosenberg et al. |
| 6,850,150 B1 * | 2/2005 | Ronkainen ............ 340/7.58 | | 2008/0068350 A1 | 3/2008 | Rosenberg et al. |
| 6,850,781 B2 | 2/2005 | Goto | | | | |
| 6,859,819 B1 | 2/2005 | Rosenberg et al. | | FOREIGN PATENT DOCUMENTS | | |
| 6,876,847 B2 | 4/2005 | Kudoh | | EP | 0062664 | 10/1982 |
| 6,882,713 B2 | 4/2005 | Sakai et al. | | EP | 0085518 | 8/1983 |
| 6,885,876 B2 | 4/2005 | Aaltonen et al. | | EP | 0265011 | 4/1988 |
| 6,940,497 B2 | 9/2005 | Vincent et al. | | EP | 0349086 | 1/1990 |
| 6,944,482 B2 | 9/2005 | Engstrom et al. | | EP | 0607580 | 7/1994 |
| 6,963,762 B2 * | 11/2005 | Kaaresoja et al. ............ 455/567 | | EP | 0626634 | 11/1994 |

| | | |
|---|---|---|
| EP | 0556999 | 5/1998 |
| EP | 0875819 | 11/1998 |
| EP | 1182851 | 2/2002 |
| JP | 63-164127 | 10/1988 |
| JP | 01-003664 | 7/1990 |
| JP | 02-109714 | 1/1992 |
| JP | 05-020226 | 3/1993 |
| JP | 04-007371 | 8/1993 |
| JP | 06-018341 | 1/1994 |
| JP | 06-139018 | 5/1994 |
| JP | 06-265991 | 9/1994 |
| JP | 05-193862 | 1/1995 |
| JP | 07-113703 | 5/1995 |
| JP | 07-266263 | 10/1995 |
| JP | 2511577 | 7/1996 |
| JP | 07-064723 | 3/1998 |
| JP | 10-105337 | 4/1998 |
| JP | 10-506508 | 6/1998 |
| JP | H11-4282 | 1/1999 |
| JP | 11-299305 | 2/1999 |
| JP | 11-085400 | 3/1999 |
| JP | 11-338629 | 12/1999 |
| JP | 2001-350592 | 12/2001 |
| JP | 2002-259059 A | 9/2002 |
| JP | 2004-186831 | 7/2004 |
| WO | WO 92/00559 | 1/1992 |
| WO | WO 95/20788 A1 | 8/1995 |
| WO | WO 95/32459 | 11/1995 |
| WO | WO 96/28777 | 9/1996 |
| WO | WO 97/12357 | 4/1997 |
| WO | WO 97/18546 | 5/1997 |
| WO | WO 97/20305 | 6/1997 |
| WO | WO 97/21160 | 6/1997 |
| WO | WO 97/31333 | 8/1997 |
| WO | WO 98/08159 | 2/1998 |
| WO | WO 98/24183 | 6/1998 |
| WO | WO 98/58323 | 12/1998 |
| WO | WO 99/40504 | 8/1999 |
| WO | WO 00/03319 | 1/2000 |
| WO | WO 00/21071 | 4/2000 |
| WO | 00/41788 | 7/2000 |
| WO | 02/03172 | 1/2002 |
| WO | WO 02/12991 | 2/2002 |
| WO | WO 02/27645 | 4/2002 |
| WO | WO 02/31807 | 4/2002 |
| WO | 02/078810 | 10/2002 |
| WO | 2004/052193 | 6/2004 |
| WO | 2004/053644 | 6/2004 |
| WO | 2004/053671 | 6/2004 |
| WO | 2004/053829 | 6/2004 |
| WO | 2004/053830 | 6/2004 |

OTHER PUBLICATIONS

Definition of 'avatar', 2001, Hargrave's Communications Dictionary.*
Search Report, International Searching Authority, PCT/US03/38862, Apr. 12, 2004.
Search Report, International Searching Authority, PCT/US03/38899, Apr. 19, 2004.
Search Report, International Searching Authority, PCT/US03/38961, Apr. 5, 2004.
Search Report, International Searching Authority, PCT/US01/41099, Jan. 2, 2002.
Search Report, International Searching Authority, PCT/US03/38900, Apr. 14, 2004.
Search Report, International Searching Authority, PCT/US03/38868, Sep. 27, 2004.
Erikson, Carl, "Polygonal Simplification: An Overview," Dept. of Computer Science, TR96-016, 1996, pp. 1-32.
Hardman, Lynda et al., "Do You Have the Time? Composition and Linking in Time-based Hypermedia," Proceedings of the 10th ACM Conference on Hypertext and Hypermedia, Feb. 1999, pp. 189-196.
MacLean, Karon E. et al., "An Architecture for Haptic Control of Media," in: The Proceedings of the ASMA Dynamic Syatems and Control Division: 1999 International Mechanical Engineering Congress and Exposition, Eighth Annual Symposium on Haptic Interfaces for Virtual Environment and Teleoperator Systems; Nov. 14-19, 1999, pp. 1-10.
Snibbe, Scott S., "Haptic Techniques for Media Control," In Proceeding of the 14th Annual ACM Symposium on User Interface Software and Technology, 2001, pp. 1-10.
Chang "Audio-Haptic Feedback in Mobile Phones", Proceedings of AMC CHI 2005 Conference on Human Factors in Computing Systems, Apr. 2-7, 2005, Portland, Oregon, pp. 1264-1267, 2005.
ISR/WO—PCT/US06/35645—dated Jun. 23, 2008.
ISR/WO—PCT/US06/45644 dated Sep. 13, 2007.
Adachi et al., "Sensory Evaluation of Virtual Haptic Push-Buttons," 1994, Suzuki Motor Corp., pp. 1-7.
Adelstein, "A Virtual Environment System for the Study of Human Arm Tremor," Ph.D. Dissertation, Dept. of Mechanical Engineering, MIT, Jun. 1989.
Adelstein, "Design and Implementation of a Force Reflecting Manipulandum for Manual Control research," DSC—vol. 42, Advances in Robotics, Edited by H. Kazerooni, pp. 1-12, 1992.
Adelstein, et al., "A High Performance Two-Degree-of-Freedom Kinesthetic Interface," MIT, 1992, pp. 108-112.
Akamatsu et al., "Multimodal Mouse: A Mouse-Type Device with Tactile and Force Display," 1994, Presence vol. 3, pp. 73-80.
Atkinson et al., "Computing with Feeling,", Comput. & Graphics, vol. 2, 1977, pp. 97-103.
Aukstakalnis et al., "Silicon Mirage: The Art and Science of Virtual Reality," ISBN 0-938151-82-7, pp. 129-180, 1992.
Baigrie, "Electric Control Loading—A Low Cost, High Performance Alternative," Proceedings, pp. 247-254, Nov. 6-8, 1990.
Batter et al., "Grope-1: A computer Display to the sense of Feel," Proc IFIP Congress, 1971, pp. 759-763.
Bejczy, "Generalization of Bilateral Force-Reflecting Control of Manipulators," Proceedings of Fourth CISM-IFToMM, Sep. 8-12, 1981.
Bejczy, "Sensors, Controls, and Man-Machine Interface for Advanced Teleoperation," Science, vol. 208, No. 4450, pp. 1327-1335, 1980.
Bejczy et al., "A Laboratory Breadboard System for Dual-Arm Teleoperation," SOAR '89 Workshop, JSC, Houston, TX, Jul. 25-27, 1989.
Bejczy et al., "Kinesthetic Coupling Between Operator and Remote Manipulator," International Computer Technology Conference, The American Society of Mechanical Engineers, San Francisco, CA, Aug. 12-15, 1980.
Bejczy, et al., "Universal Computer Control System (UCCS) for Space Telerobots," CH2413-3/87/0000/0318501.00 1987 IEEE.
Bejezy et al., "The Phantom Robot: Predictive Displays for Teleoperation with Time Delay," IEEE CH2876, Jan. 1990, pp. 546-550.
Bliss, James C., "Optical-to-Tactile Image Conversion for the Blind," IEEE Transactions on Man-Machine Systems, vol. MMS-11, No. 1, 1970, pp. 58-65.
Bolanowski, S.J. et al., "Four Channels Mediate the Mechanical Aspects of Touch," J. Acoust. Soc. Am. 84 vol. 84 (5), Nov. 1988, pp. 1680-1694.
Brooks et al., "Hand Controllers for Teleoperation—A State-of-the-Art Technology Survey and Evaluation," JPL Publication 85-11; NASA-CR-175890; N85-28559, pp. 1-84, Mar. 1, 1985.
Brooks, Jr. et al., "Project GROPE, Haptic Displays for Scientific Visualization,", Computer Graphics, vol. 24, #4, 1990, pp. 177-184.
Burdea et al., "Distributed Virtual Force Feedback, Lecture Notes for Workshop on Force Display in Virtual Environments and its Application to Robotic Teleoperation," 1993 IEEE International Conference on Robotics and Automation, pp. 25-44, May 2, 1993.
Buttolo et al., "Pen-based force Display for Precision Manipulation in Virtual Environments," IEEE 0-8186-7084-3, 1995, pp. 217-224.
Calder, "Design of A Force-Feedback Touch-Introducing Actuator for Teleoperator Robot Control," Bachelor of Science Thesis, MIT, Jun. 23, 1983.
Caldwell et al., "Enhanced Tactile Feedback (Tele-Taction) Using a Multi-Functional Sensory System," 1050-4729/93, pp. 955-960, 1993.
Colgate et al., "Implementation of Stiff Virtual Walls in Force-Reflecting Interfaces," Northwestern University, IL, 1993., pp. 1-8.

Dennerlein et al., "Vibrotactile Feedback for Industrial Telemanipulators," 1997, Sixth Annual Symp. on Haptic Interfaces for Virtual Env. and Teleoperator Systems, ASME IMECE, Dallas, pp. 1-7.

Dennerlein, Jack et al., "Commercialization of Vibrotactile Feedback for Telemanipulation and Virtual Environments," 1997, Phase I Final Report for ONR Contract N00014-96-C-0325 (not published or publicly available).

Durlach, Nathaniel I. et al, "Virtual Reality: Scientific and Technological Challenges", National Academy Press, Washington, DC 1995 pp. 160-205.

Eberhardt, Silvio P. et al., "Inducing Dynamic Haptic Perception by the Hand: System Description and Some Results," Proceedings of ASME Dynamic Systems and Control, vol. DSC-55-1, No. 1, 1994, pp. 345-351.

Eberhardt, Silvio P. et al., "OMAR—A Haptic Display for Speech Perception by Deaf and Deaf-Blind Individuals," IEEE 1993, pp. 195-201.

Ellis et al., Design & Evaluation of a High-Performance Prototype Planar Haptic Interface, Dec. 1993, Advances in Robotics, 55-64.

Fischer, et al., "Specification and Design of Input Devices for Teleoperation," IEEE CH2876, Jan. 1990, pp. 540-545.

Fokumoto, "Active Click: Tactile Feedback for Touch Panels," ACM CHI2001 Extended Abstracts, pp. 121-122, Apr. 2001.

Frisken-Gibson, Sarah F. et al, "A 64-Solenoid, Four-Level Fingertip Search Display for the Blind," IEEE Transactions on Biomedical Engineering, vol. BME-34, No. 12, Dec. 1987, pp. 963-965.

Gobel et al., "Tactile Feedback Applied to Computer Mice," International Journal of Human-Computer Interaction, vol. 7, No. 1, pp. 1-24, 1995.

Goldstein, Moise H. et al., "Tactile Aids for the Profoundly Deaf Child," 77 J. Acoust. Soc. Am 77 (1), Jan. 1985, pp. 258-265.

Gotow et al., "Controlled Impedance Test Apparatus for Studying Human Interpretation of Kinesthetic Feedback," WA11-11:00, pp. 332-337.

Gotow et al., "Perception of Mechanical Properties at the Man—Machine Interface," IEEE CH2503-1, 1987, pp. 688-690.

Hannaford et al., "Force-Feedback Cursor Control," NASA Tech Briefs, vol. 13, No. 11, 1989, pp. 1-7.

Hannaford et al., "Performance Evaluation of a 6-Axis Generalized Force-Reflecting Teleoperator," IEEE Transactions on Systems, Man, and Cybernetics, vol. 21, No. 3, 1991, pp. 621-623, 631-633.

Hasser, C., "Tactile Feedback for a Force-Reflecting Haptic Display," School of Eng., Univ. of Dayton, Dayton, OH, 1995, pp. 1-98.

Hasser, C. et al., "Tactile Feedback with Adaptive Controller for a Force-Reflecting Haptic Display," Parts 1 and 2, IEEE 0-7803-3131-1, 1996, pp. 526-533.

Hirota et al., "Development of Surface Display," IEEE 0-7803-1363-1, 1993, pp. 256-262.

Howe, "A Force-Reflecting Teleoperated Hand System for the Study of Tactile Sensing in Precision Manipulation," Proceedings of the 1992 IEEE International Conference on Robotics and Automation, Nice, France, May 1992.

Howe et al., "Task Performance w/ a dextrous Teleoperated Hand System," Proc. of SPIE, vol. 1833, 1992, pp. 1-9.

IBM Technical Disclosure Bulletin, "Mouse Ball-Actuating Device With Force and Tactile Feedback," vol. 32, No. 9B, Feb. 1990.

Iwata, "Pen-based Haptic Virtual Environment," 0-7803-1363-1/93 IEEE, pp. 287-292, 1993.

Iwata, Hiroo, "Artificial Reality with Force-feedback: Development of Desktop Virtual Space with Compact Master Manipulator," Computer Graphics, vol. 24, No. 4, Aug. 1990, pp. 165-170.

Jackson, K. M., "Linerity of Radio-Frequency Transducers", Medical and Biological Engineering and Computer, Jul. 1977, pp. 446-449.

Jacobsen et al., "High Performance, Dextrous Telerobotic Manipulator With Force Reflection," InterventiorVROV '91 Conference & Exposition, Hollywood, Florida, May 21-23, 1991.

Johnson, David A., "Shape-Memory Alloy Tactile Feedback Actuator," Armstrong Aerospace Medical Research Laboratory, AAMRL-TR-90-039, Aug. 1990. (Tini Allow Company, Inc., Aug. 1990, 2 pages, pp. i-33).

Jones et al., "A perceptual analysis of stiffness," ISSN 0014-4819 Springer International (Springer-Verlag); Experimental Brain Research, vol. 79, No. 1, pp. 150-156, 1990.

Kaczmarek, K. A. et al. "Tactile Displays," in: Virtual Environments and Advanced Interface Design, New York: Oxford University Press, 1995, pp. 349-414.

Kaczmarek, Kurt A. et al, "Electrotactile and Vibrotactile Displays for Sensory Substitution Systems", IEEE Transactions on Biomedical Engineering, vol. 38, No. 1, Jan. 1991, pp. 1-16.

Kelley et al., "MagicMouse: Tactile and Kinesthetic Feedback in the Human—Computer Interface using an Electromagnetically Actuated Input/Output Device," Oct. 19, 1993 University of British Columbia pp. 1-27.

Kelley et al., "On the Development of a Force-Feedback Mouse and its Integration into a graphical user Interface," Nov. 1994, Engineering Congress and Exhibition, pp. 1-8.

Kilpatrick et al., "The Use of Kinesthetic Supplement in an Interactive Graphics System," University of North Carolina, 1976, pp. 1-172.

Kontarinis et al., "Display of High-Frequency Tactile Information to Teleoperators," Telemanipulator Technology and Space Telerobotics, Won S. Kim, Editor, Proc. SPIE vol. 2057, pp. 40-50, Sep. 7-9, 1993.

Kontarinis et al., "Tactile Display of Vibratory Information in Teleoperation and Virtual Environments," PRESENCE, 4(4):387-402, 1995.

Kotoku, "A Predictive Display with Force Feedback and its Application to Remote Manipulation System with Transmission Time Delay," Proc. of IEEE/RSJ Int'l Conf. on Intelligent Robots and Systems, Jul. 1992.

Kotoku, et al., "Environment Modeling for the Interactive Display (EMID) Used in Telerobotic Systems," IEEE/RSJ Int'l Workshop on Intelligent Robots and Systems, Nov. 1991, pp. 999-1004.

Lake, "Cyberman from Logitech," GameBytes, 1994.

"Cyberman Technical Specification," Logitech Cyberman SWIFT Supplement, Apr. 5, 1994.

Marcus, "Touch Feedback in Surgery," Proceedings of Virtual Reality and Medicine the Cutting Edge, Sep. 8-11, 1994.

McAffee et al, Teleoperator Subsystem/Telerobot Demonstrator: Force Reflecting Hand Controller Equipment Manual, JPL D-5172, pp. 1-50, A1-A36, B1-B5, C1-C36, Jan. 1988.

Millman et al., "Design of a 4 Degree of Freedom Force-Reflecting Manipulandum with a Specified Force/Torque Workspace," IEEE CH2969-4, 1991, pp. 1488-1493.

Minsky, "Computational Haptics: The Sandpaper System for Synthesizing Texture for a Force-Feedback Display," Ph.D. Dissertation, MIT, Jun. 1995.

Minsky et al., "Feeling & Seeing:Issues in Force Display," ACM089791-351-5, 1990, pp. 235-242, 270.

Munch et al., "Intelligent Control for Haptic Displays," Eurographics '96, vol. 15, No. 3, 1996, pp. 217-226.

Noll, "Man-Machine Tactile," SID Journal, Jul./Aug. 1972 Issue.

Ouh-Young, "Force Display in Molecular Docking," Order No. 9034744, p. 1-369, 1990.

Ouh-Young, "A Low-Cost Force Feedback Joystick and Its Use in PC Video Games," IEEE Transactions on Consumer Electronics, vol. 41, No. 3, Aug. 1995.

Ouh-Young et al., "The Development of A Low-Cost Force Feedback Joystick and Its Use in the Virtual Reality Environment," Proceedings of the Third Pacific Conference on Computer Graphics and Applications, Pacific Graphics '95, Seoul, Korea, Aug. 21-24, 1995.

Ouh-Young et al., "Creating an Illusion of Feel: Control Issues in Force Display," Univ. of N. Carolina, 1989, pp. 1-14.

Ouh-young, et al., Using a Manipulator for Force Display in Molecular Docking, IEEE CH2555, 1988, pp. 1824-1829.

Patrick et al., "Design and Testing of A Non-reactive, Fingertip, Tactile Display for Interaction with Remote Environments," Cooperative Intelligent Robotics in Space, Rui J. deFigueiredo et al., Editor, Proc. SPIE vol. 1387, pp. 215-222, 1990.

Patrick, "Design, Construction, and Testing of a Fingertip Tactile Display for Interaction with Virtual and Remote Environments," Master of Science Thesis, MIT, Nov. 8, 1990.

Payette et al., "Evaluation of a Force Feedback (Haptic) Computer Printing Device in Zero Gravity," Oct. 17, 1996, ASME Dynamics Systems, vol. 58 pp. 547-553.
Peine, W.J., "Tactile Shape Displays for Small Scale Shape Feedback," http://www.hrl.harvard.eduk-peine/display.html, 1998, pp. 1-2.
Pimentel et al., Virtual Reality: through the new looking glass, 2nd Edition; McGraw-Hill, ISBN 0-07-050167-X, pp. 41-202, 1994.
Rabinowitz, W. M. et al., "Multidimensional Tactile Displays: Identification of Vibratory Intensity, Frequency, and Contactor Area," J. Acoust. Soc. Am. 82 (4), Oct. 1987, pp. 1243-1252.
Ramstein, Christophe, "Combining Haptic and Braille Technologies: Design Issues and Pilot Study," Assets '96, 2nd Annual ACM Conference on Assistive Technologies, ACM Sigraph, Apr. 1996, pp. 37-44.
Ramstein et al., "The Pantograph: A Large Workspace Haptic Device for a Multimodal Human—Computer Interaction," Computer—Human Interaction, CHI 1994, pp. 1-3.
Rosenberg, "Virtual Fixtures: Perceptual Overlays Enhance Operator Performance in Telepresence Tasks," Ph.D. Dissertation, Stanford University, Jun. 1994.
Rosenberg, L., "Virtual fixtures as tools to enhance operator performance in telepresence environments," SPIE Manipulator Technology, 1993, pp. 1-12.
Rosenberg et al., "A Force Feedback Programming Primer," Immersion Corp., 1997, pp. 1-176.
Rosenberg et al., "Commercially Viable force feedback Controller for Individuals with Neuromotor Disabilities," Armstrong Laboratory, AL/CF-TR-1997-0016, 1996, pp. 1-33.
Rosenberg et al., "Perceptual Decomposition of Virtual Haptic Surfaces," Proc. IEEE Symposium on Research Frontiers in Virtual Reality, 1993, pp. 1-8.
Rosenberg et al., "The use of force feedback to enhance graphical user interfaces," Stereoscopic Displays & Virtual Reality Systems, 1996, pp. 243-248.
Rosenberg, "Perceptual Design of a Virtual Rigid Surface Contact," Armstrong Laboratory AL/CF-TR-1995-0029, 1993, pp. 1-45.
Rosenberg, "Virtual Haptic Overlays Enhance Performance in Telepresence Tasks," Dept. of Mech. Eng., Stanford Univ., 1994.
Rosenberg, et al., "The Use of Force Feedback to Enhance Graphical User Interfaces," Proc. SPIE 2653, 1996, pp. 243-248.
Russo, "Controlling Dissipative Magnetic Particle Brakes in Force Reflective Devices," DSC—vol. 42, Advances in Robotics, pp. 63-70, ASME 1992.
Russo, "The Design and Implementation of a Three Degree of Freedom Force Output Joystick," MIT Libraries Archives Aug. 14, 1990, pp. 1-131, May 1990.
Scannell, "Taking a Joystick Ride," Computer Currents, Boston Edition, vol. 9, No. 11, Nov. 1994.
Schmult et al., "Application Areas for a Force-Feedback Joystick," 1993, Advances in Robotics, vol. 49, pp. 47-54.
"Component Maintenance Manual with Illustrated Parts List, Coaxial Shaker Part No. C-25502" Safe Flight Instrument Corporation, Revised Jan. 28, 2002 (3 pages).
"Technical Manual Overhaul Instructions With Parts Breakdown, Coaxial Control Shaker Part No. C-25502", Safe Flight Instrument Corporation, revised Jul. 15, 1980 (23 pages).
Safe Flight Instruments Corporation, "Coaxial Control Shaker," Part No. C-25502, Jul. 1, 1967.
Shimoga, "Finger Force and Touch Feedback Issues in Dexterous Telemanipulation," Proceedings of Fourth Annual Conference on Intelligent Robotic Systems for Space Exploration, Rensselaer Polytechnic Institute, Sep. 30-Oct. 1, 1992.
Force Feedback Touch Panel, Represented by CSC Division, Sales Department, SIXIK Corporation, Tokyo, Japan, www.smk.co.jp.
SMK Corporation, "Force Feedback Type Optical Touch Panel Developed," SMK Corporation Website, Oct. 30, 2002.
SMK Corporation, "Multi-Functional Touch Panel, Force-Feedback Type, Developed: A Touch Panel Providing a Clicking Feeling," http://www.smk.co.jp/whatsnew_e/628csc_e.html, Sep. 30, 2002.
Snow et al., "Model-X Force-Reflecting-Hand-Controller," NT Control No. MPO-17851; JPL Case No. 5348, pp. 1-4, Jun. 15, 1989.
Stanley et al., "Computer Simulation of Interacting Dynamic Mechanical Systems Using Distributed Memory Parallel Processors," DSC—vol. 42, Advances in Robotics, pp. 55-61, ASME 1992.
Su et al., "The Virtual Panel Architectures: A 3D Gesture Framework," University of Maryland, pp. 387-393.
Tadros, "Control System Design for a Three Degree of Freedom Virtual Environment Simulator Using Motor/Brake Pair Actuators", MIT Archive © Massachusetts Institute of Technology, pp. 1-88, Feb. 1990.
Tan et al., "Manual Resolution of Compliance When Work and Force Cues are Minimized," DSC—vol. 49, Advances in Robotics, Mechatronics, and Haptic Interfaces, ASME 1993, pp. 99-104.
Terry et al., "Tactile Feedback in a Computer Mouse," Proceedings of Fourteenth Annual Northeast Broengineenng Conference, University of New Hampshire, Mar. 10-11, 1988.
Wiker, "Teletouch Display Development: Phase 1 Report," Technical Report 1230, Naval Ocean Systems Center, San Diego, Apr. 17, 1989.
Wiker, Steven F., "Teletouch Display Development: Phase 1 Report," Naval Ocean Systems Center, Technical Report 1230, Jul. 1988, 66 pages.
Wiker, Steven F. et al., "Development of Tactile Mice for Blind Access to Computers: Importance of Stimulation Locus, Object Size, and Vibrotactile Display Resolution," Proceedings of the Human Factors Society 35th Annual Meeting, 1991, pp. 708-712.
Winey III, "Computer Stimulated Visual & Tactile Feedback as an Aid to Manipulator & Vehicle Control," MIT, 1981, pp. 1-79.
Yamakita et al., "Tele-Virtual Reality of Dynamic Mechanical Model," Proc. of IEEE/RSJ Int'l Conf. on Intelligent Robots and Systems, Jul. 1992, pp. 1103-1110.
Yokokoji, et al., "What You Can See is What You Can Feel—Development of a Visual/Haptic Interface to Virtual Environment," Proc. VRAIS 1996.
Yokokoji et al., "What you can see is what you can feel," IEEE 0-8186-7295-1, 1996, pp. 46-54.
IPRP PCT/US2005/036861 mailed Feb. 23, 2006.
ISR/WO—PCT/US2005/036861 mailed Feb. 23, 2006.
Extended Search Report, including the Search Opinion, as issued for European Patent Application No. 06814576.2, dated Jun. 6, 2012.

* cited by examiner

HAPTIC MESSAGING IN HANDHELD COMMUNICATION DEVICES

CROSS-REFERENCE TO RELATED APPLICATIONS

This application claims priority based upon to U.S. Provisional Patent Application Ser. No. 60/431,662, filed on Dec. 8, 2002, the entire disclosure of which is incorporated herein by reference. This application also claims priority under the Patent Cooperation Treaty based upon co-pending PCT application no. PCT/US03/38900 filed Dec. 8, 2003.

FIELD OF THE INVENTION

This invention relates generally to haptic-feedback systems. More specifically, embodiments of the present invention relate to using customized haptic effects in a variety of applications to convey information to users of handheld communication devices.

BACKGROUND

As handheld communication devices become part of everyday life, device manufactures and service providers strive to enhance the versatility and performance of such devices.

Handheld communication devices in the art (e.g., mobile phones, pagers, personal digital assistants (PDAs), etc.) typically use auditory and visual cues to alert a user when incoming messages, such as voice calls and emails, are received. Such auditory and visual alerts, however, have the disadvantages of being distracting in some situations (e.g., during driving), or annoying in others (e.g., during a meeting or a concert). Although vibratory alerts are made available in some communication devices such as cellular phones, such vibratory effects cannot be customized or personalized according to applications, thus conveying little information to the user. A need, therefore, exists in the art for a new sensory modality that delivers information to users of handheld communication devices in a personalized fashion.

SUMMARY

Embodiments of the invention relate to methods and systems for providing customized "haptic messaging" to users of handheld communication devices in a variety of applications.

In one embodiment, a method of haptic messaging includes: receiving an input signal associated with an actuation of a user-interface member; determining a haptic code associated with the actuation; and including the haptic code in an output signal to be sent to a remote handheld communication device.

In another embodiment, a method of haptic messaging includes: receiving an input signal; outputting a request relating to a contact with a user-interface member coupled to a handheld communication device; and providing a control signal associated with the contact to an actuator coupled to the handheld communication device, the control signal being configured to cause the actuator to output a haptic effect associated with the input signal.

Further details and advantages of embodiments of the invention are set forth below.

BRIEF DESCRIPTION OF THE FIGURES

These and other features, aspects, and advantages of the present invention are better understood when the following Detailed Description is read with reference to the accompanying drawings, wherein.

DETAILED DESCRIPTION

Embodiments described in the following description are provided by way of example to illustrate some general principles of the invention, and should not be construed as limiting the scope of the invention in any manner. One skilled in the art would also recognize that various changes and modifications can be made herein, without departing from the principles and scope of the invention.

Figure 1:
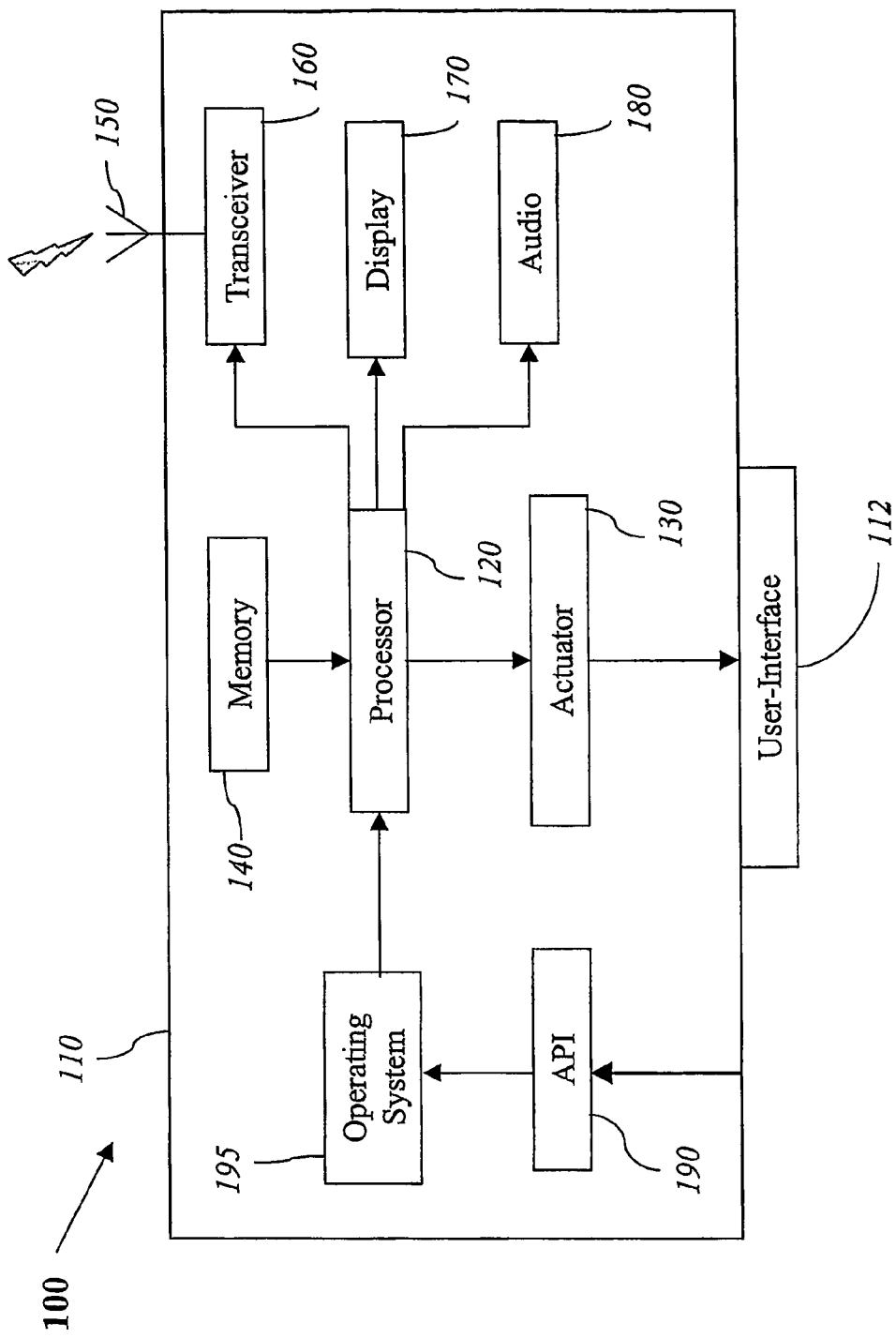
FIG. 1 depicts a block diagram of a haptic handheld communication device according to an embodiment of the present invention.

FIG. 1 depicts a block diagram of a handheld communication device 100 according to an embodiment of the invention. It will be appreciated that various elements are shown in schematic form for illustrative purposes and are not drawn to scale. It will also be appreciated that many alternative ways of practicing the present invention exit. Accordingly, various changes and modifications may be made herein, without departing from the principles and scope of the invention.

Device 100 includes a device body including a housing 110 and a user-interface 112; a processor 120; at least one actuator 130 in communication with processor 120; and a memory 140 in communication with processor 120. Device 100 also includes an antenna 150 and a transceiver 160, in communication with processor 120. Device 100 additionally includes a display module 170 and an audio module 180, in communication with processor 120. Display module 170 may include, for example, a liquid crystal device. Audio means 180 may include, for example, a speaker, a microphone, and the like.

For purpose of illustration in the embodiment of FIG. 1, processor 120, actuator 130, and memory 140 are shown to be enclosed within and coupled to the device body. Such an illustration, however, should not be construed as limiting the scope of the invention in any manner. In alternative embodiments, actuator 130 may, for example, be coupled to the outside of housing 110, or embedded in housing 110 via a suitable mechanism. Further, user-interface 112 may include one or more user-interface members. As used herein, a user-interface member includes, without limitation, a key pad having one or more keys, one or more buttons, a touch screen or touch pad, a scroll wheel, a direction pad, a trackball, a knob, a miniature joystick, or other user-interface means known in the art.

Device 100 further includes an API (Application Program Interface) 190, working in conjunction with an operating system 195. A device driver (not shown) may optionally provide an interface between operating system 195 and processor 120.

Memory 140 of device 100 stores a program code that includes instructions to cause processor 120 to perform various tasks. The following description provides some examples.

Figure 2:
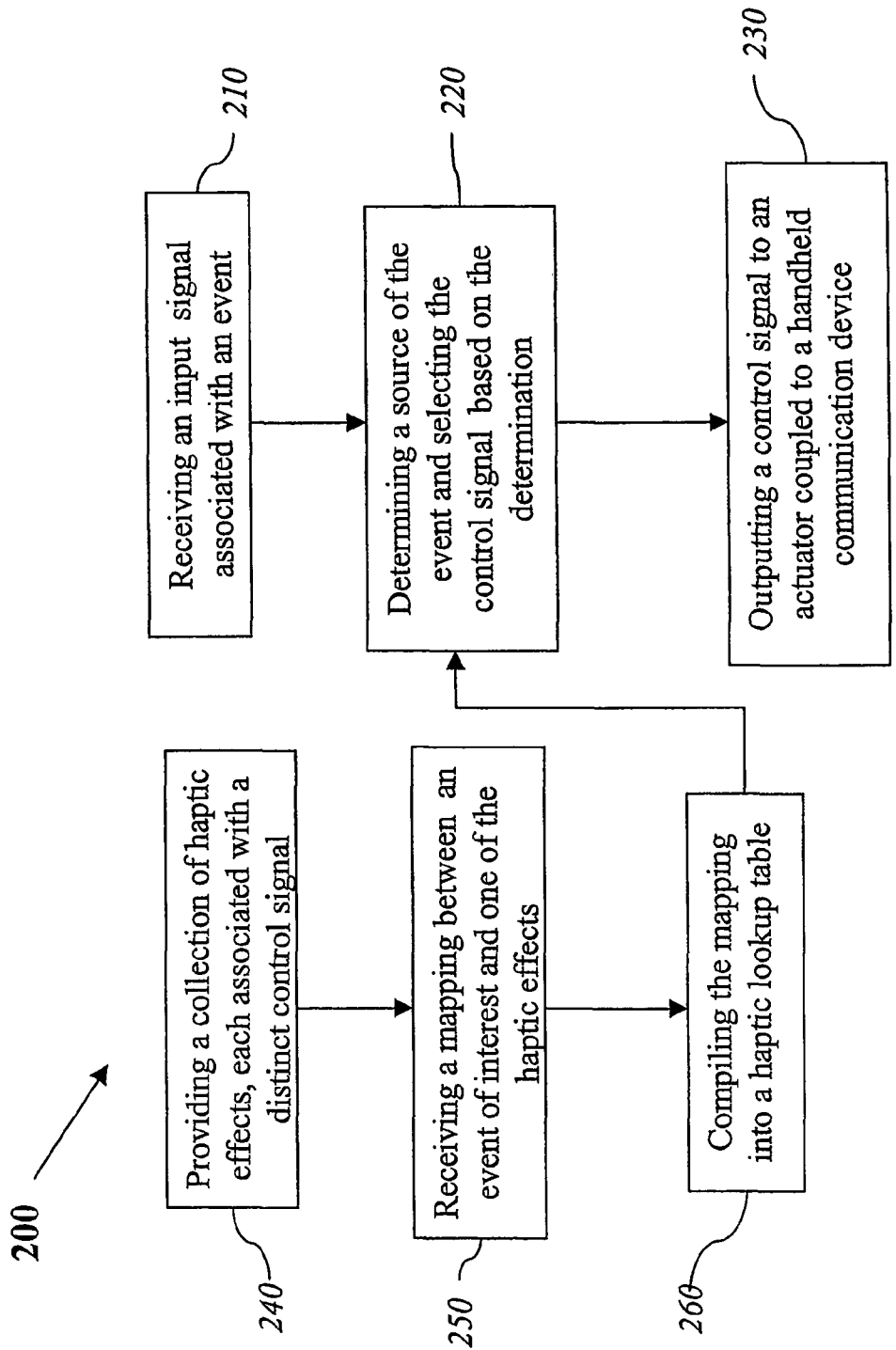
FIG. 2 shows a flowchart depicting a method of using customized haptic effects to convey information to users of handheld communication devices, according to an embodiment of the invention.

FIG. 2 shows a flowchart 200 depicting a method of using customized haptic effects to convey information to users of handheld communication devices, according to an embodiment of the invention. At step 210, an input signal associated with an event is received. At step 220, a source of the event is determined and a control signal is selected based on the determination. At step 230, a control signal is output to an actuator coupled to a handheld communication device (see FIG. 1 for an embodiment of such device). The control signal is configured to cause the actuator to output a haptic effect associated with the event.

Furthermore at step 240, a collection of haptic effects is provided, each haptic effect being associated with a control signal. For example, memory 140 of FIG. 1 can store a program code that includes instructions to generate the control signals (e.g., each characterized by a distinct waveform) for rendering the corresponding haptic effects. Haptic effects (along with associated control signals) may also be downloaded or transmitted from a remote source, such as a service provider, a network resource, a Web server, a remote handheld communication device or computer. Such downloaded or transmitted haptic effects can be further edited or modified. At step 250, a mapping between an event of interest and one of the stored haptic effects is received. By way of example, memory 140 of FIG. 1 may also store a program code that enables a user to map an event of interest to one of the haptic effects as provided, e.g., via user-interface 112 through API 190, where the event may be identified by its source. At step 260, the one-to-one mappings made between various events of interest and the corresponding haptic effects are compiled into a haptic lookup table, which can, for example, be stored in memory 140 of FIG. 1.

In the embodiment of FIG. 2, the term "selecting" includes, without limitation, looking up a predetermined mapping between the event of interest and a corresponding haptic effect based on the source determination, and selecting/generating a control signal that is configured to render the desired haptic effect associated with the event (e.g., upon being applied to an actuator). Selection can be made based upon the aforementioned haptic lookup table, for example.

In one embodiment, the input signal may include a communication signal associated with a call event, such as a voice call, an e-mail, or a message in text or multimedia form, which may be received via antenna 150 and transceiver 160 of FIG. 1, for example. The "source" of a call event may be related to a characteristic that distinctly identifies or characterizes the call event, such as the caller's phone number, the sender's e-mail address, a graphical feature or an icon associated with the incoming message, etc.

In another embodiment, the input signal may be associated with a reminder event, which may be a self-generated message on the handheld communication device serving as a reminder for a pre-scheduled activity (e.g., an appointment or a meeting). The source in this scenario may be associated with the type of a pre-scheduled activity (e.g., a business meeting vs. a restaurant reservation), or the time at which the pre-scheduled activity takes place.

In yet another embodiment, the input signal may include a communication signal associated with a status event, for example, received via antenna 150 and transceiver 160 of FIG. 1. Examples of a status event include, but are not limited to: an advertisement (e.g., sale) event, a one-to-one marketing event, a business-transaction event, a stock-trading event, a weather-forecast event, a sports (or game) event, an entertainment event, and an emergency (e.g., 911) event. In this scenario, the source may be associated with a characteristic that distinctly identifies the sender and/or the nature of a status event, such as the phone number of the handheld user's stock broker, the e-mail address of the user's favorite store, the logo associated with the user's favorite TV or radio station, and so on.

In one embodiment, an event of interest can be accompanied by a distinct haptic effect, or overlapping haptic effects, conveying to the user customized information such as "who is calling," "what is happening," and so on. The user can also be allowed to update the haptic lookup table, e.g., to include new events, and/or to modify the mappings between the existing events of interest and the corresponding haptic effects.

Moreover, a specific haptic effect can be assigned to any incoming signal event whose source is unknown, so as to alert the user that the incoming message is from an un-identifiable or sender.

As used herein, the term "handheld communication device" includes, without limitation, a mobile phone such as a cellular phone or a satellite phone, a personal digital assistant (PDA), a cordless telephone, a pager, a two-way radio, a handheld or portable computer, a game console controller, a personal gaming device, an MP3 player, or other personal electronic devices known in the art that are equipped with communication or networking capabilities.

In one embodiment, the aforementioned haptic effects can be used as haptic ringers (e.g., counterparts to auditory ring tones) that are customized or personalized to convey information to the user about various events of interest. By way of example, a haptic ringer associated with a call from a loved one (e.g., the user's spouse) may comprise low-amplitude and high frequency vibrations that impart gentle sensations to the user. In contrast, a haptic ringer associated with an emergency event (such as a 911-call) may comprise jolt-like pulses that impart pounding sensations to the user.

In contrast with conventional auditory ring tones, the aforementioned haptic effects (e.g., haptic ringers) are more desirable in an environment where extraneous auditory signals are prohibited (e.g., during a meeting or a concert), and/or where it is difficult to distinguish auditory signals (e.g., in a loud environment such as an airport). The haptic ringers are also more suitable in distracting situations such as driving, so that the user of a handheld communication device can keep eyes on the road without having to look at the device. Moreover, such haptic ringers convey customized information to the user, so that the user is aware of "who is calling," "what is happening," and so on, as the following examples further illustrate.

A handheld communication device such as a mobile phone may be configured to allow a user to include haptic information or a haptic code in an outgoing communication signal, e.g., carrying a voice call, an e-mail, or a message. The encoding of a communication signal with haptic information may be based on an established scheme or protocol, and/or on a per-system basis. The haptic code is configured to cause a haptic effect to be output when the communication signal is delivered to another handheld communication device. In one embodiment, businesses and organizations may each be associated with a distinct haptic logo (e.g., a particular vibration pattern) and include their haptic logos in various messages sent to the handheld communication devices of their customers. Such haptic logos can serve as counterparts to conventional logos known in the art, for example. Various status events mentioned above may also be transmitted in this manner. By way of example, a merchant may include its haptic logo in various advertisement events and business transaction events to be transmitted to the handheld communication devices of its customers. Stock brokers (or brokerage firms), TV or radio stations, and marketing/advertising agencies may likewise include their haptic logos in various stock-trading events, weather-forecast events, sports events, entertainment events, and one-to-one marketing events to be transmitted to the handheld users.

Figure 3:
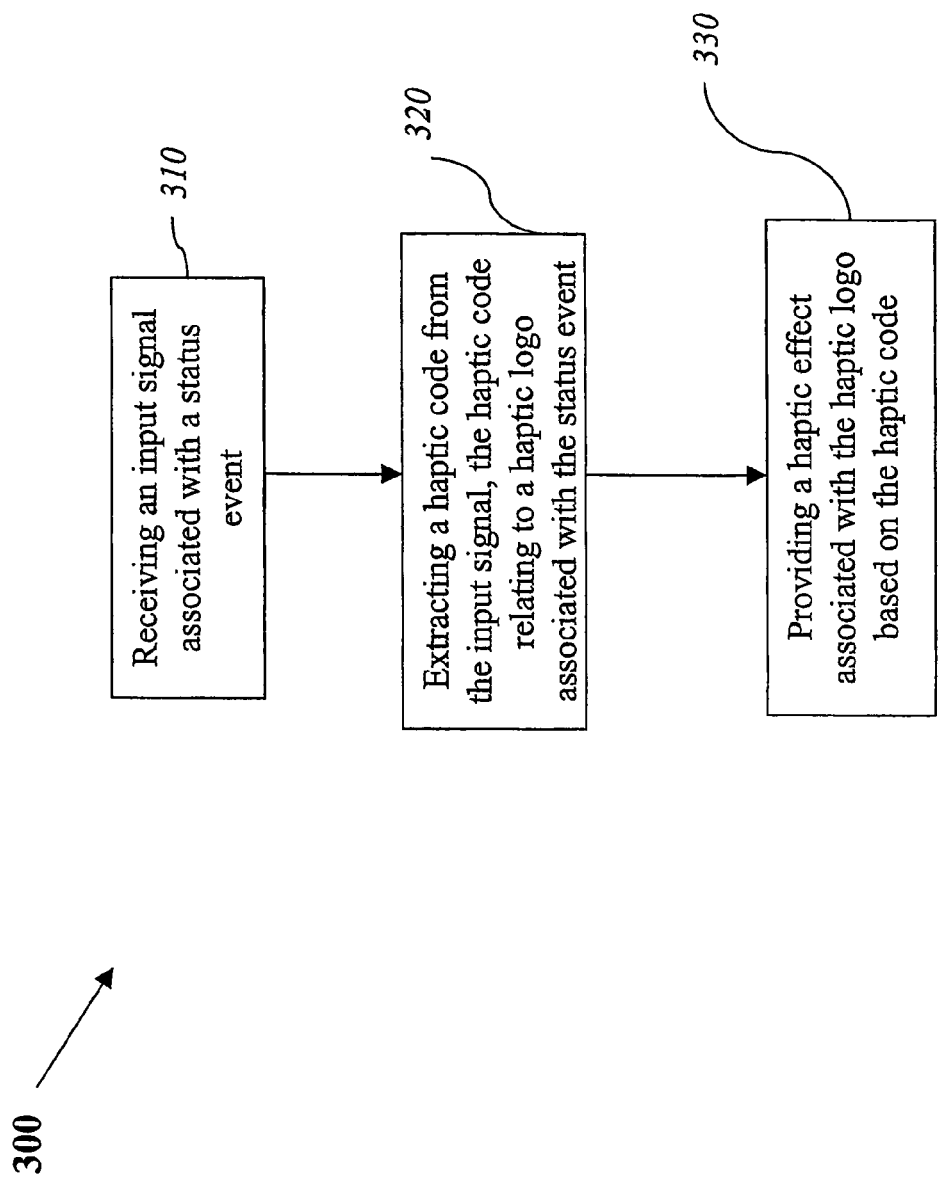
FIG. 3 shows a flowchart depicting a method of using haptic logos to relate information to users of handheld communication devices, according to an embodiment of the invention.

FIG. 3 shows a flowchart 300 depicting a method of using haptic logos to relate information to users of handheld communication devices, according to an embodiment of the invention. A handheld communication device receives an input signal at step 310, the input signal being associated with a status event. The handheld communication device extracts a haptic code from the input signal at step 320, where the haptic code is associated with a haptic logo. At step 330, the handheld communication device provides a haptic effect associated with the haptic logo. Step 330 may include providing a control signal to an actuator coupled to the handheld communication device, where the control signal is based at least in part on the haptic code and configured to cause the actuator to output the haptic effect.

In one embodiment, the extracted haptic code may be directly applied to the actuator for rendering the desired haptic effect. In another embodiment, the haptic code may be configured according to a predetermined scheme or protocol that includes, for example, a table of haptic codes (some of which may be associated with one or more haptic logos) versus control signals for rendering the corresponding haptic effects. In this way, a processor in the handheld communication device can look up the corresponding control signal from the table based on the extracted haptic code, and output the selected control signal to the actuator for rendering the desired haptic effect.

In the embodiments of FIG. 2 or 3, the handheld communication device (or the haptic code) may be programmed such that the haptic effect is output immediately, or at a prescribed time after receiving the input signal, as desired in applications. The haptic effects can also be triggered by, or synchronized with, other occurrences.

A handheld communication device may be further configured such that some of its user-interface members (such as those described above) are each associated with a haptic code, e.g., according to a predetermined scheme or protocol. In one embodiment, some of these haptic codes may be associated with haptic effects that emulate expressions or behaviors, such as "laugh," "giggle," "hug," "high-five," "heartbeat," "pet purring," etc. This allows haptic effects to be transmitted and experienced, e.g., in an interactive conversation or a chat session, by pressing or manipulating such members.

By way of example, suppose that user A (termed "Alice" herein) is engaged in a chat session with user B (termed "Bob" herein) via their respective mobile phones. In one embodiment, when Bob tells Alice a joke, Alice can respond by sending a "laugh" sensation to Bob, e.g., by pressing a key on her mobile phone that is assigned with a haptic code corresponding to a laugh sensation. This causes a signal to be transmitted from Alice's phone to Bob's phone, and a corresponding haptic effect to be output to Bob's phone (and thereby experienced by Bob). In alternative embodiments, Alice can include a haptic code in an outgoing message (which may also contain a video image such as a picture taken by her mobile phone, and/or a graphical feature such as an emoticon emulating a smiley face) to be transmitted to Bob, e.g., by pressing the corresponding user-interface member. The haptic code causes a haptic effect to be output when the message is delivered to a remote device such as Bob's mobile phone. In one embodiment, the haptic effect may be correlated or synchronized with the displaying of a video image contained in the message. In another embodiment, the generation of the haptic effect based on the haptic code may be carried out in a manner similar to that described above with respect to the embodiment of FIG. 3.

Figure 4:
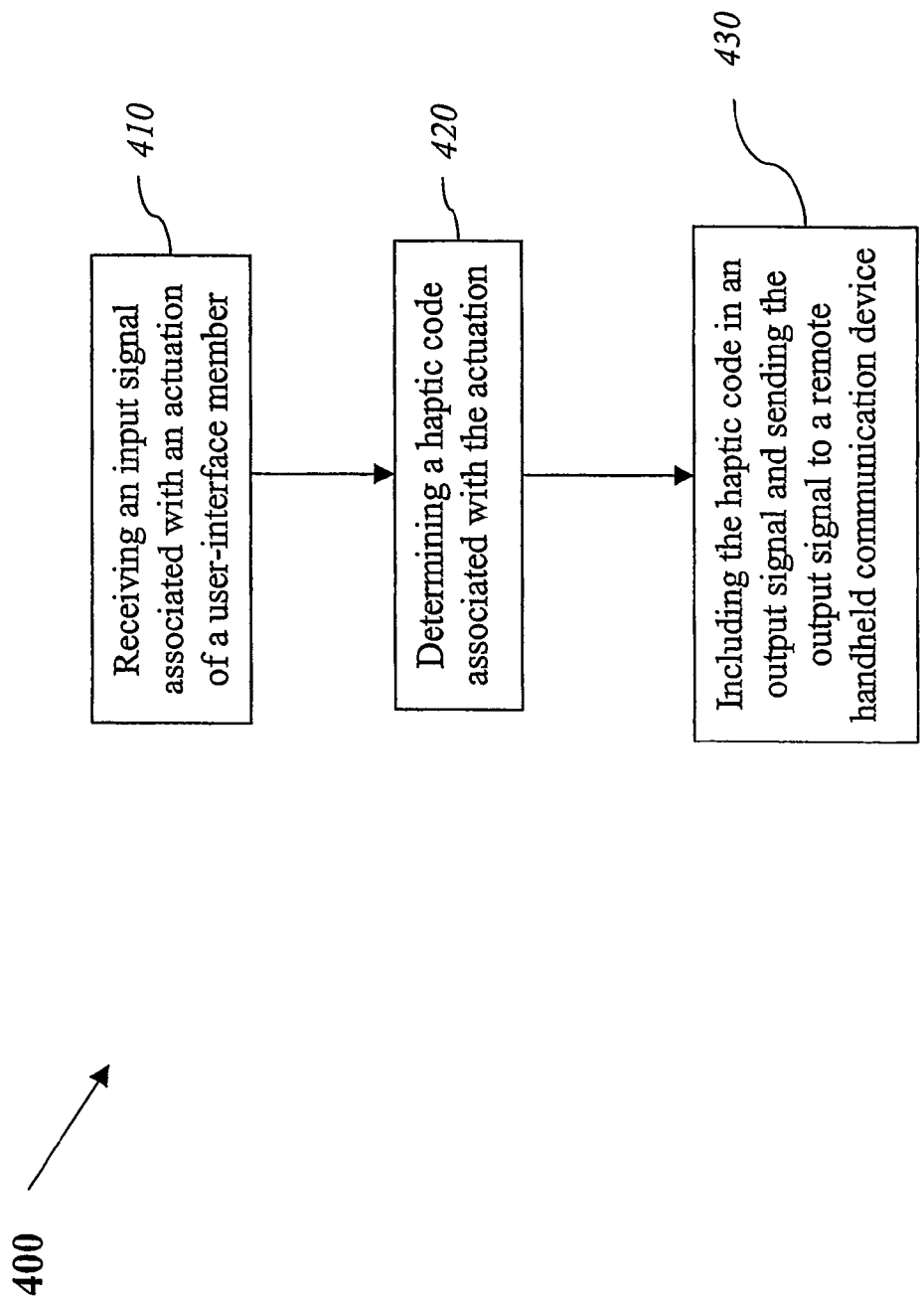
FIG. 4 shows a flowchart depicting a method of haptically encoding communication signals, according to an embodiment of the invention.

FIG. 4 depicts a flowchart 400 illustrating a method of a method of haptically encoding communication signals, according to an embodiment of the invention. At step 410, an input signal associated with an actuation of a user-interface member is received. By way of example, the input signal may be associated with Alice's pressing or manipulating a particular user-interface member. At step 420, a haptic code associated with the actuation is determined. At step 430, the haptic code is included in an output signal, and the output signal is sent to a remote handheld communication device. As described above, the output signal may also include a message, a video image, and/or a graphical feature.

Figure 5:
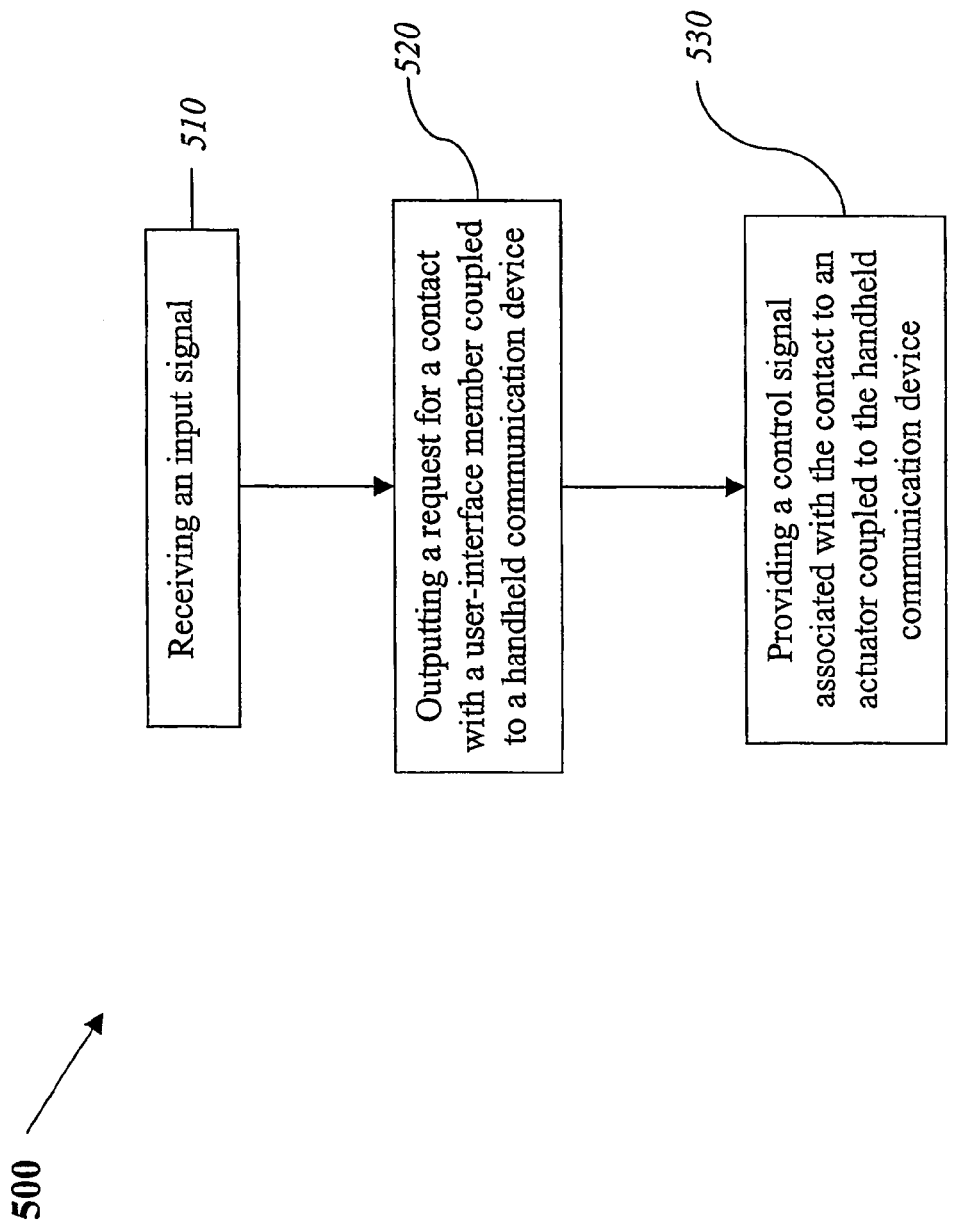
FIG. 5 shows a flowchart depicting a method of providing haptic messaging to users of handheld communication devices, according to a further embodiment of the invention.

A handheld communication device may also be configured such that a haptic effect, along with a message, is output upon a contact with a user-interface member being made (e.g., by a user or an input device). FIG. 5 depicts a flowchart 500 illustrating a method of haptic message that can be associated with this situation, according to an embodiment of the invention. At step 510 of the flowchart 500, a handheld communication device receives an input signal. At step 520, the handheld communication device outputs a request for a contact with a user-interface member coupled to the handheld communication device. At step 530, the handheld communication device provides a control signal associated with the contact to an actuator coupled to the handheld communication device. The control signal is configured to cause the actuator to output a haptic effect associated with the input signal. Step 520 may include having a visual effect displayed, an auditory effect played, and/or a distinctive haptic ringer output, which requests a contact with the user-interface member being made.

In one embodiment, the input signal in FIG. 5 may include a haptic code, along with a message, a video image, and/or a graphical feature, etc. For example, the haptic code may be configured to cause a "hug" sensation to be output when the video image contained in the input signal is displayed. The input signal may also contain a provision or protocol that specifies that the incoming message along with the corresponding haptic effect is output upon a contact with a particular user-interface member (e.g., the #5 key) being made. Alternatively, the handheld communication device may determine the user-interface member to be contacted, before outputting incoming message along with the corresponding haptic effect.

In another embodiment, the input signal of FIG. 5 may be associated with a "virtual touch," e.g., to mimic a handshake, a "high-five," a pat on the back, a pulse or heartbeat sensation, a pet purring sensation, or other touch sensations associated with human (and/or human-animal) interactions. In one scenario, the input signal at step 510 may include a "virtual touch indicator," based on which the request for a contact with a particular user-interface member is made. The virtual touch indicator may be in the form of a haptic code, a message, or other informative means. The control signal at step 530 may be generated, e.g., based on the virtual touch indicator, a haptic code associated with the user-interface member at play, or other predetermined scheme. The input signal at step 510 may also include a virtual touch indicator along with a virtual touch signal for rendering the desired haptic effect. In this case, the control signal at step 530 may be based on the virtual touch signal.

Referring back to the chat session between Alice and Bob, by way of example at the end of their chat session, Alice may wish to send Bob a "high-five." She sends to Bob's mobile phone a signal including a virtual touch indicator, which in turn prompts a request that Bob be in contact with a user-interface member coupled to his phone, such as a direction pad (e.g., by putting his fingers on the individual keys of the direction pad), a key pad, a touch screen, a trackball, a joystick, or the like. The control signal for rendering a haptic effect that emulates a "high-five" may be based on the haptic code associated with the user-interface member, transmitted with the input signal from Alice, and/or other predetermined scheme.

Figure 6:
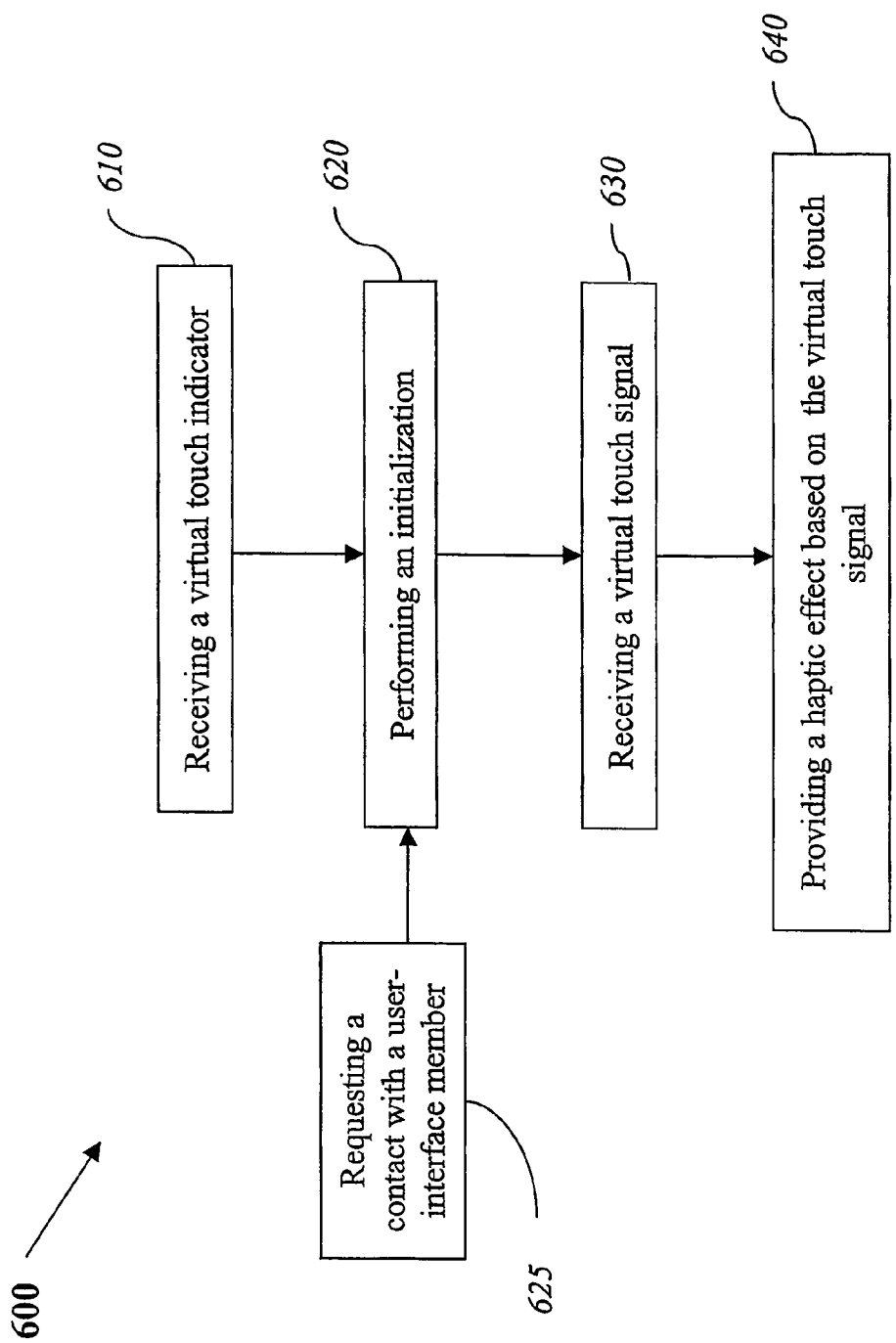
FIG. 6 shows a flowchart illustrating a method of providing an interactive virtual touch in one embodiment of the present invention.

Interactive virtual touch can also be engaged between users of handheld communication devices, where the manipulation of a user-interface member on one handheld communication device is transmitted possibly in substantially real-time to another handheld device and experienced by its user, and vice versa. FIG. 6 depicts a flowchart 600 illustrating a method of providing interactive virtual touch in one embodiment of the present invention. In the embodiment shown, a handheld communication device first receives an input signal including a virtual touch indicator at step 610. A distinctive haptic ringer may, for example, accompany the arrival of the virtual touch indicator, identifying the sender and the nature of the input signal. The handheld communication device may then perform any necessary initialization to enable the communication at step 620, which may also include requesting a contact with a particular user-interface member coupled to the handheld communication device at step 625. The handheld communication device subsequently receives a virtual touch signal in the communication associated with the desired haptic effect at step 630. The handheld communication device provides the haptic effect at step 640, e.g., by applying the virtual touch signal to an actuator coupled to the user-interface member.

In one embodiment, the virtual touch signal may be associated with the manipulation of a user-interface member on a remote handheld device and transmitted in substantially real-time. And the user on the receiving end may respond by acting in a similar fashion, so as to emulate an interactive touch. Any schemes for delivering virtual touch to users of handheld communication devices may be used.

Figure 7:
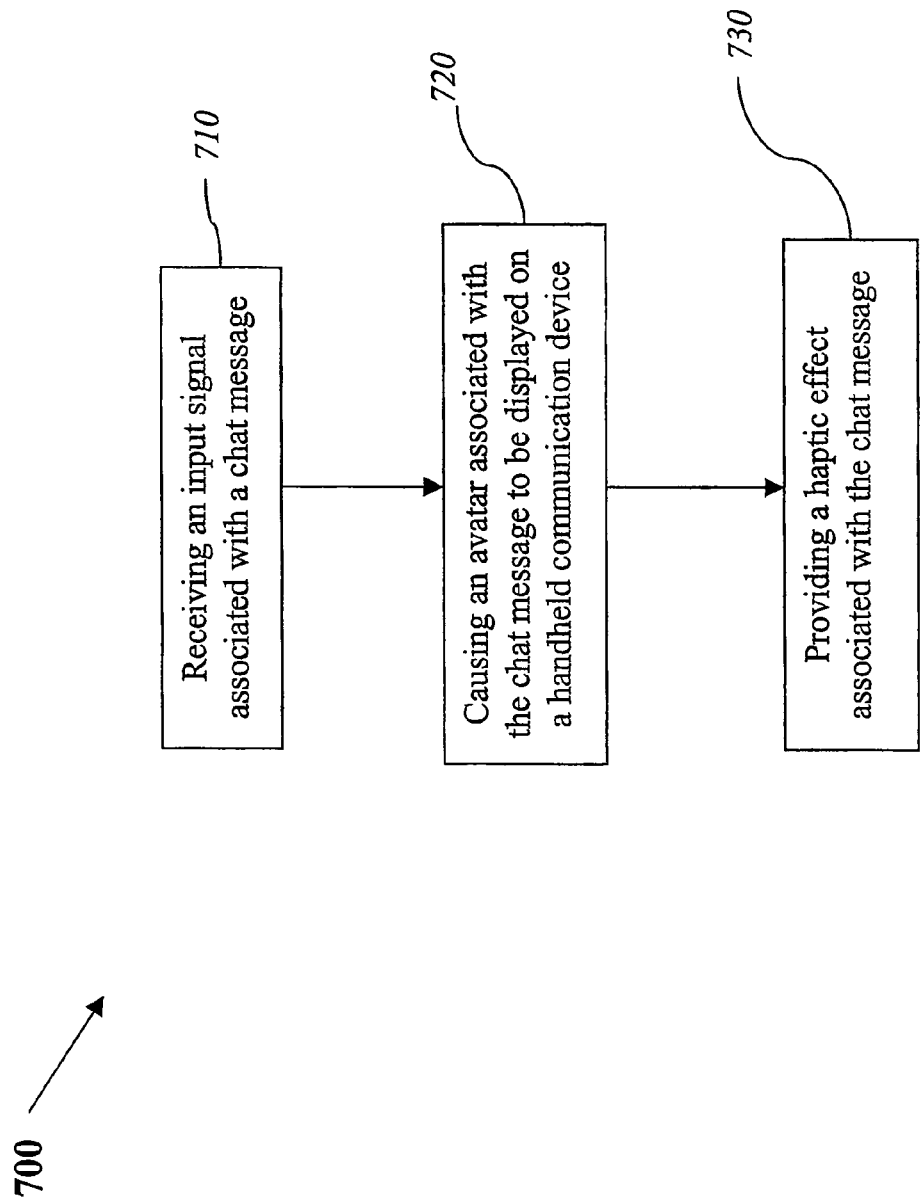
FIG. 7 depicts a flowchart illustrating a method of carrying out a chat session using handheld communication devices, according to an embodiment of the invention.

Haptic effects can also be used to enhance and complement the information content communicated between handheld communication devices. In one embodiment, a plurality of handheld communication users may be engaged in a chat session via their handheld communication devices. The users may each have a graphical representation or avatar displayed on other handheld communication devices. Such avatars can also be haptically enabled, for example, whereby their expressions and/or behaviors are accompanied and enhanced by corresponding haptic effects. FIG. 7 is a flowchart 700 depicting a method of carrying out a chat session using handheld communication devices, according to an embodiment of the invention. In the embodiment shown, a handheld communication device receives an input signal associated with a chat message at step 710. The handheld communication device displays an avatar associated with the chat message at step 720. The avatar may be shown on display 170 of FIG. 1, in one embodiment. At step 730, the handheld communication device provides a haptic effect associated with the chat message. Step 730 may include outputting a control signal to an actuator coupled to the handheld communication device, where the control signal is configured to cause the actuator to output the haptic effect. In one embodiment, the haptic effect may be correlated with an expression or behavior of the avatar, such as a laugh or giggle, a cry, a pet purring, or the like.

Figure 8:
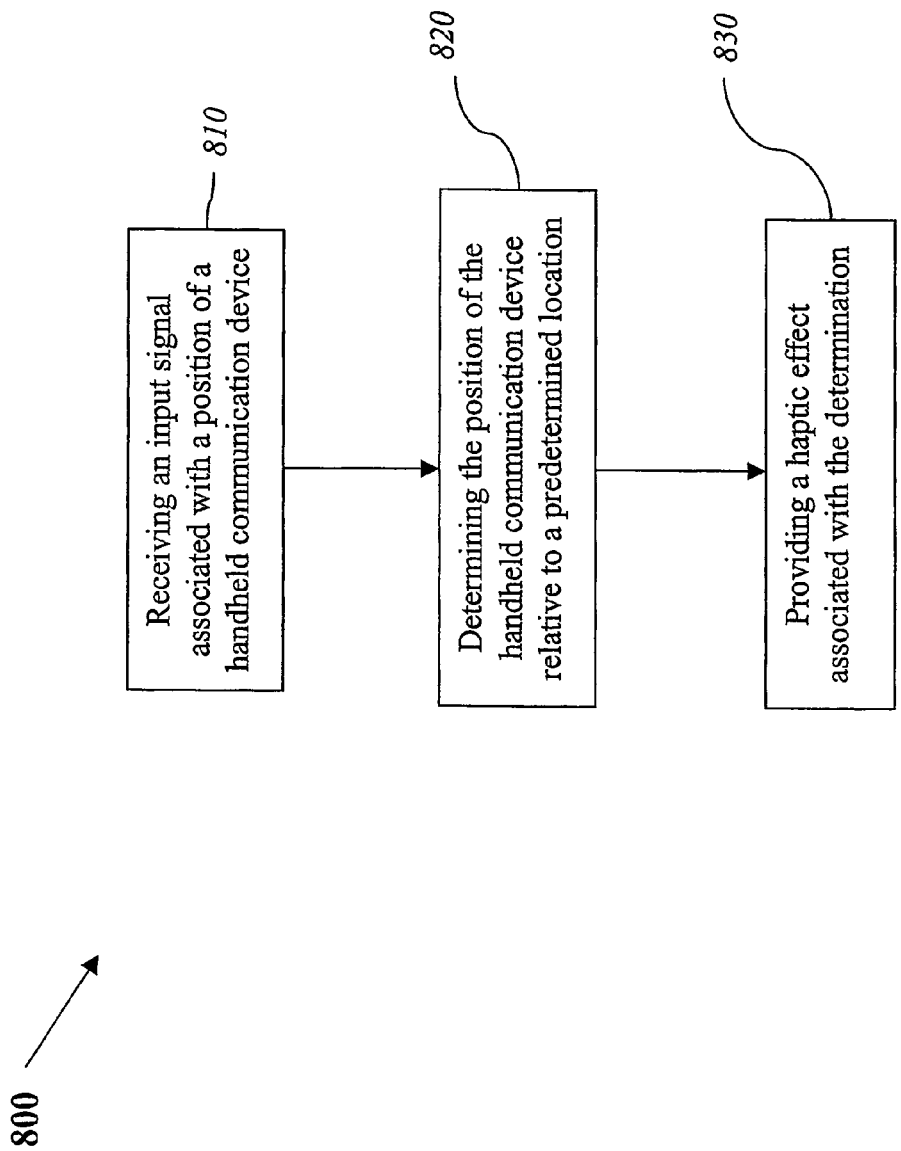
FIG. 8 shows a flowchart depicting a method of using haptic effects to relate navigation information, according to an embodiment of the invention.

Handheld communication devices are increasingly equipped with navigation capability, for example, in communication with the Global Position System (GPS) or other navigation systems. Haptic effects can also be used to convey navigation information, such as positional and/or directional information, to handheld users. By way of example, FIG. 8 shows a flowchart 800 depicting a method of haptic navigation, according to an embodiment of the present invention. The flowchart 800 discloses receiving an input signal associated with a position of a handheld communication device at step 810; determining the position of a handheld communication device relative to a predetermined location at step 820; and providing a haptic effect associated with the determination at step 830. Step 830 may include outputting a control signal associated with the determination to an actuator coupled to the handheld communication device, the control signal being configured to cause the actuator to output the haptic effect. Further, the input signal at step 810 may be received from GPS, a digital compass, or other navigation systems known in the art.

In one embodiment, the haptic effect may be associated with a distance between the position of the handheld communication device and a predetermined location (termed "destination" herein). For example, the haptic effect may include a vibration having a magnitude and a frequency, where at least one of the magnitude and the frequency decreases as the distance from the destination diminishes. Additionally, the haptic effect may be configured to convey a quantitative measure of the distance. By way of example, the haptic effect may include one or more pulse or jolt sensations, where the number of pulses is proportional to the number of miles between the position of the handheld device and the destination.

Processors described above (including processor 120 of FIG. 1) can include, for example, one or more digital logical processors capable of processing input, execute algorithms, and generate output as necessary to perform various tasks, such as those described above. Such processors/controllers may include a microprocessor, an Application Specific Integrated Circuit (ASIC), and state machines. Such processors include, or may be in communication with, media (including memory 140 of FIG. 1). Such media include, for example, computer readable media, which stores program code that, when executed by a processor, cause the processor to perform the steps described herein. Embodiments of computer-readable media include, but are not limited to, an electronic, optical, magnetic, or other storage or transmission device capable of providing a processor, such as the processor in a web server, with computer-readable instructions. Other examples of suitable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. Also, various other forms of computer-readable media may transmit or carry instructions to a computer, including a router, private or public network, or other transmission device or channel.

Program code and associated application programs related to various applications may also reside on a remote source, such as a network resource, a Web server, a remote handheld communication device or computer, which can be transmitted or downloaded to a handheld communication device on a regular or predetermined basis. Haptic effects (along with associated control signals) can also be downloaded or transmitted from a remote source, as described above.

Actuators described above (including actuator 130 shown in FIG. 1) can include, for example, a pager motor, an eccentric rotating motor, a harmonic eccentric rotating motor, a voice coil, a solenoid, a resistive actuator, a piezoelectric actuator, an electro-active polymer actuator, or other types of active/passive actuators suitable for generating haptic effects. U.S. Pat. Nos. 6,429,846 and 6,424,333 disclose further details relating to some of these actuators, both of which are incorporated in full herein by reference. In some embodiments, one or more actuators may be implemented in a handheld communication device, configured to deliver appropriate haptic effects. It will be appreciated that various control schemes can be devised accordingly, for controlling the actuator(s) in a manner that best achieves the desired haptic effects.

Referring back to FIG. 1. In one embodiment, actuator 130 may be coupled to housing 110, thereby imparting haptic effects thus generated to the device body. Haptic ringers (or alerts) described above may be delivered in this manner, for instance. In another embodiment, actuator 130 may be coupled to user-interface 112 of the device body. For instance, an active and/or resistive actuator can be coupled to user-interface 112 to deliver a virtual touch described above. One or more actuators can also be coupled to user-interface 112, for example, to convey a virtual touch such to a user. In yet another embodiment, a plurality of actuators can be coupled to housing 110 as well as user-interface 112. In addition, one or more actuators may also be coupled to a headset, a wristband, or other accessory means associated with a handheld communication device.

Embodiments of the invention include the following.

In one embodiment, an individual (or "Bob") can have a mobile phone according to the invention. The mobile phone also has an e-mail capability, for example, including both "receive" and "send"). The mobile phone is configured to provide a plurality of haptic effects, e.g., by including appropriate hardware (such as actuators described above) and program code. Bob can program the mobile phone, for example, via user-interface 112 through API 150 shown in FIG. 1, by inputting various events of interest and associating each with a distinct haptic effect. Thus, when an event of interest is subsequently received, the mobile phone provides the corresponding haptic effect.

In one embodiment, Bob's phone includes programming that provides a first haptic effect when an input signal is received from the mobile phone of Bob's wife (or "Alice"). Bob's phone also includes programming that provides a second haptic effect that is different and distinct from the first haptic effect, when an input signal is received from the mobile phone of Bob's supervisor at work (termed "Carol" herein). Bob's phone is further be configured to provide a third haptic effect that is different from the two mentioned above, e.g., when an e-mail is received from the e-mail address of Bob's stock broker (where the e-mail contains a "smiley-face" emoticon, for instance). The third haptic effect can be a vibration with high magnitude and short duration, e.g., to emulate a "high-five."

In another embodiment, Bob can be watching a movie in a theater with his mobile phone in his pocket. It is set to make no noise, because Bob is in a theater. While Bob is watching the movie, Bob's mobile phone vibrates with the second haptic effect mentioned above. Bob chooses to ignore the call, because he does not wish to speak with his supervisor at a movie theater. Later, Bob's mobile phone vibrates with the first haptic effect. Bob wants to speak with Alice, for example, to make plans to meet later. So Bob answers the phone and quickly exits the theater to talk with Alice.

Bob's mobile phone can also include a personal schedule/calendar application. After speaking with Alice, Bob can enter an entry in the calendar at the 7:00 PM time mark—"Meet Alice". Bob can also choose a fourth haptic effect to associate with the calendar entry. The mobile phone can be programmed to output the fourth haptic effect fifteen minutes before the time entry of the calendar (i.e., at 6:45 PM).

Bob's mobile phone can be equipped with GPS capability, along with an associated application program for location determination. Bob can also store addresses of various locations of interest in the application program. In one embodiment, Bob can be on the road. Bob's mobile phone vibrates with a distinct fifth haptic effect. Bob recognizes the fifth haptic effect being associated with the haptic logo of his favorite electronics store. He then checks with the application program, and receives a sixth haptic effect associated with the distance between his current position and the store location. Bob then decides to make a stop at the store.

A haptically-enabled handheld communication device of the invention may be further used as a two-way haptic remote control, for example, for controlling a remote system such as a Television set or a multimedia system. In one embodiment, the events as referred to above may be related to program channels shown on the remote system, each identified by a channel number (which may be used as the "source"), for instance. The corresponding haptic effects may be customized on a per-channel basis. Such haptic effects can serve to inform a user as to which channel is on, as a user is channel-surfing by way of this haptic remote control, so that the user need not to look up the display screen.

Figure 9:
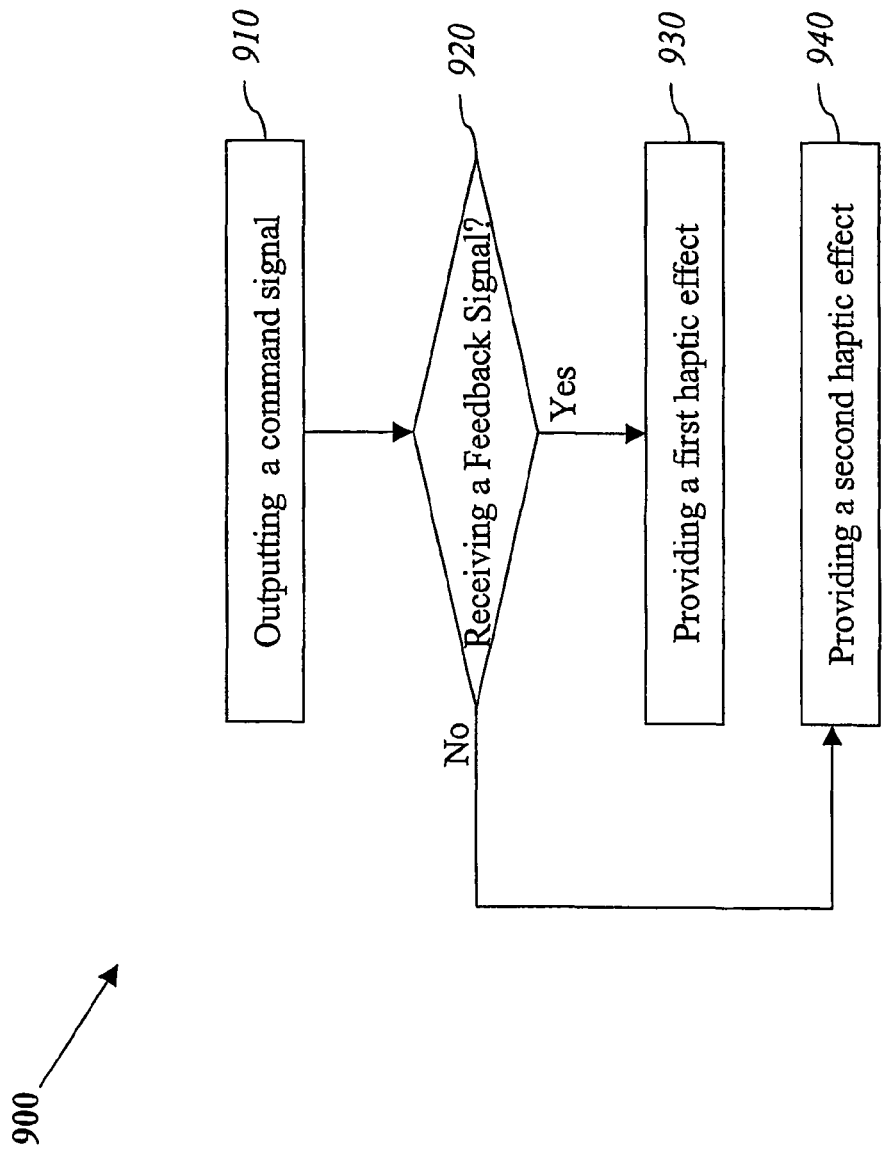
FIG. 9 shows a flowchart illustrating a method for providing haptic effects to a remote control in one embodiment of the present invention.

FIG. 9 depicts a flowchart illustrating a method for providing haptic effects to a remote control in one embodiment of the present invention. In the embodiment shown, the remote control sends a command signal to a remote system at step 910. As with a conventional remote control, the signal may or may not reach the television. The remote control then determines whether a feedback signal has been received at step 920. If the remote control receives a feedback signal, the remote control provides a first haptic effect at step 930. If not, the remote control provides a second haptic effect at step 940.

The first haptic effect can be further customized according to the received feedback signal. In one embodiment, the remote system provides information (e.g., via the feedback signal) to the remote control regarding the state of the display, e.g., based on a predetermined scheme. The remote control may use the information to determine a corresponding haptic effect to provide at step 930. In alternative embodiments, the remote system may determine the appropriate haptic effect to provide and include a corresponding haptic code in the feedback signal. The remote control provides the haptic effect at step 930 based on this haptic code.

The foregoing description of the preferred embodiments of the invention has been presented only for the purpose of illustration and description and is not intended to be exhaustive or to limit the invention to the precise forms disclosed. Numerous modifications and adaptations thereof will be apparent to those skilled in the art without departing from the spirit and scope of the present invention.

That which is claimed is:

1. A method, comprising:
   receiving, at a first handheld communication device, a first indication that a first user-interface member of the first handheld communication device has been actuated, wherein the first user-interface member is assigned with a first haptic code configured to convey a first expression or behavior;
   generating, at the first handheld communication device during a non-verbal chat session between the first handheld communication device and a second handheld communication device, an output signal based on the first indication;
   causing, during the non-verbal chat session, the output signal to be sent to the second handheld communication device remote from the first handheld communication device, wherein the output signal is configured to cause a haptic effect corresponding to the first haptic code;
   receiving a second indication that a second user-interface member different from the first user-interface member has been actuated, wherein the second user-interface member is assigned with a second haptic code configured to convey a second expression or behavior, wherein the second haptic code is different from the first haptic code;
   generating a second output signal based on the second indication, wherein the second output signal includes the second haptic code; and
   causing the second output signal to be sent to the second handheld communication device, wherein second output signal is configured to cause a second haptic effect corresponding to the second haptic code.

2. The method of claim 1, further comprising:
   communicating, by the first handheld communication device, a message, a video image, or a graphical feature.

3. The method of claim 1 wherein the first haptic code is associated with a predetermined scheme.

4. The method of claim 1, wherein the first user-interface member comprises a key, a button, a key pad, a direction pad, a soft key of a touch screen, a scroll wheel, a mini-joystick, a trackball or a knob.

5. The method of claim 1, wherein the first haptic code is configured to be directly applied to an actuator of the second handheld communication device to cause the haptic effect.

6. A non-transient computer-readable medium including instructions that when executed on one or more processors cause the one or more processors to:
   receive, at a first handheld communication device, a first indication that a first user-interface member of the first handheld communication device has been actuated, wherein the first user-interface member is assigned with a first haptic code configured to convey a first expression or behavior;
   generate, at the first handheld communication device during a non-verbal chat session between the first handheld communication device and a second handheld communication device, an output signal based on the first indication;
   cause the output signal to be sent to the second handheld communication device remote from the first handheld communication device during the non-verbal chat session, wherein the output signal is configured to cause a haptic effect corresponding to the first haptic code;
   receive a second indication that a second user-interface member different from the first user-interface member has been actuated, wherein the second user-interface members member is assigned with a second haptic code configured to convey a second expression or behavior, wherein the second haptic code is different from the first haptic code;
   generate a second output signal based on the second indication, wherein the second output signal includes the second haptic code; and
   cause the second output signal to be sent to the second handheld communication device, wherein second output signal is configured to cause a second haptic effect corresponding to the second haptic code.

7. The non-transient computer-readable medium of claim 6, the output signal comprising a message, a video image, or a graphical feature.

8. The non-transient computer-readable medium of claim 6, wherein the first haptic code is associated with a predetermined scheme.

9. The non-transient computer-readable medium of claim 6, the instructions when executed by the processor further configure the processor to:
   receive, at the first handheld communication device, a signal originating from the second handheld communication device and communicated during the non-verbal chat session; and
   generate, at the first handheld communication device, a third haptic effect based on the received signal.

10. The non-transient computer-readable medium of claim 6, wherein the output signal is associated with a status event that uniquely identifies the first handheld communication device.

11. A handheld communication device, comprising:
    a body comprising a plurality of user-interface members and an antenna configured to transmit a signal from the handheld communication device; and
    a processor in data communication with the plurality of user-interface members, wherein the processor is configured to:
    receive a first indication that a first user-interface member of the first handheld communication device has been actuated, wherein the first user-interface member is assigned with a first haptic code configured to convey a first expression or behavior;
    generate, during a non-verbal chat session between the handheld communication device and a second handheld communication device, an output signal based on the first indication and cause the output signal to be sent to the second handheld communication device, during the non-verbal chat session, wherein the output signal is configured to cause a haptic effect corresponding to the first haptic code;
    receive a second indication that a second user-interface member different from the first user-interface member has been actuated, wherein the second user-interface member is assigned with a second haptic code configured to convey a second expression or behavior, wherein the second haptic code is different from the first haptic code;
    generate a second output signal based on the second indication, wherein the second output signal includes the second haptic code; and
    cause the second output signal to be sent to the second handheld communication device, wherein second output signal is configured to cause a second haptic effect corresponding to the second haptic code.

12. The handheld communication device of claim 11, wherein the handheld communication device comprises a cellular phone, a satellite phone, a cordless phone, a personal digital assistant, a pager, a two-way radio, a portable computer, a game console controller, a personal gaming device, or an MP3 player.

13. The handheld communication device of claim 11, wherein the first user-interface member comprises a key, a button, a key pad, a direction pad, a soft key of a touch screen, a scroll, wheel, a mini-joystick, a trackball, or a knob.

14. The handheld communication device of claim 11 further comprising memory, wherein the memory stores program code for extracting information corresponding to the haptic stimuli from the input signal.

15. The handheld communication device of claim 11 further comprising a display device in communication with the processor, wherein the processor is configured to cause the display device to produce an image of the identified source.

16. The handheld communication device of claim 11, wherein the processor is further configured to:
   receive, at the first handheld communication device, a signal originating from the second handheld communication device and communicated during the non-verbal chat session; and
   generate, at the first handheld communication device, a third haptic effect based on the received signal.

17. The handheld communication device of claim 11, wherein the output signal is associated with a status event that uniquely identifies the first handheld communication device.

18. A method, comprising:
   receiving, at a first handheld communication device during a non-verbal chat session between the first handheld communication device and a second handheld communication device, an actuation of a first user-interface member of the first handheld communication device, wherein an avatar representing a user is displayed during the non-verbal chat session, the avatar exhibiting a particular behavior that changes during the non-verbal chat session based on the actuation;
   generating, at the first handheld communication device, an output signal based on the actuation, wherein the output signal comprises a haptic code configured to cause a haptic effect that is synchronized with the particular behavior of the avatar;
   causing the output signal to be sent to the second handheld communication device during the non-verbal chat session;
   receiving a second actuation of a second user-interface member of the handheld communication device, wherein the second user-interface member is assigned with a second haptic code configured to convey a second expression or behavior and is different from the first user-interface member, wherein the second haptic code is different from the haptic code;
   generating a second output signal based on the second actuation, wherein the second output signal includes the second haptic code; and
   causing the second output signal to be sent to the second handheld communication device, wherein second output signal is configured to cause a second haptic effect corresponding to the second haptic code.

19. The method of claim 1, further comprising:
   receiving, at the first handheld communication device, a signal originating from the second handheld communication device and communicated during the non-verbal chat session; and
   generating, at the first handheld communication device, a third haptic effect based on the received signal.

20. The method of claim 1, wherein the output signal is associated with a status event that uniquely identifies the first handheld communication device.

* * * * *